Oct. 18, 1932.　　　S. H. WISMER　　　1,883,239
SOUND REPRODUCING MACHINE
Original Filed April 14, 1924　　12 Sheets-Sheet 1

INVENTOR
BY Samuel H. Wismer.
Mauro, Cameron, Lewis & Massey
ATTORNEYS

Oct. 18, 1932.　　　S. H. WISMER　　　1,883,239
SOUND REPRODUCING MACHINE
Original Filed April 14, 1924　　12 Sheets-Sheet 2
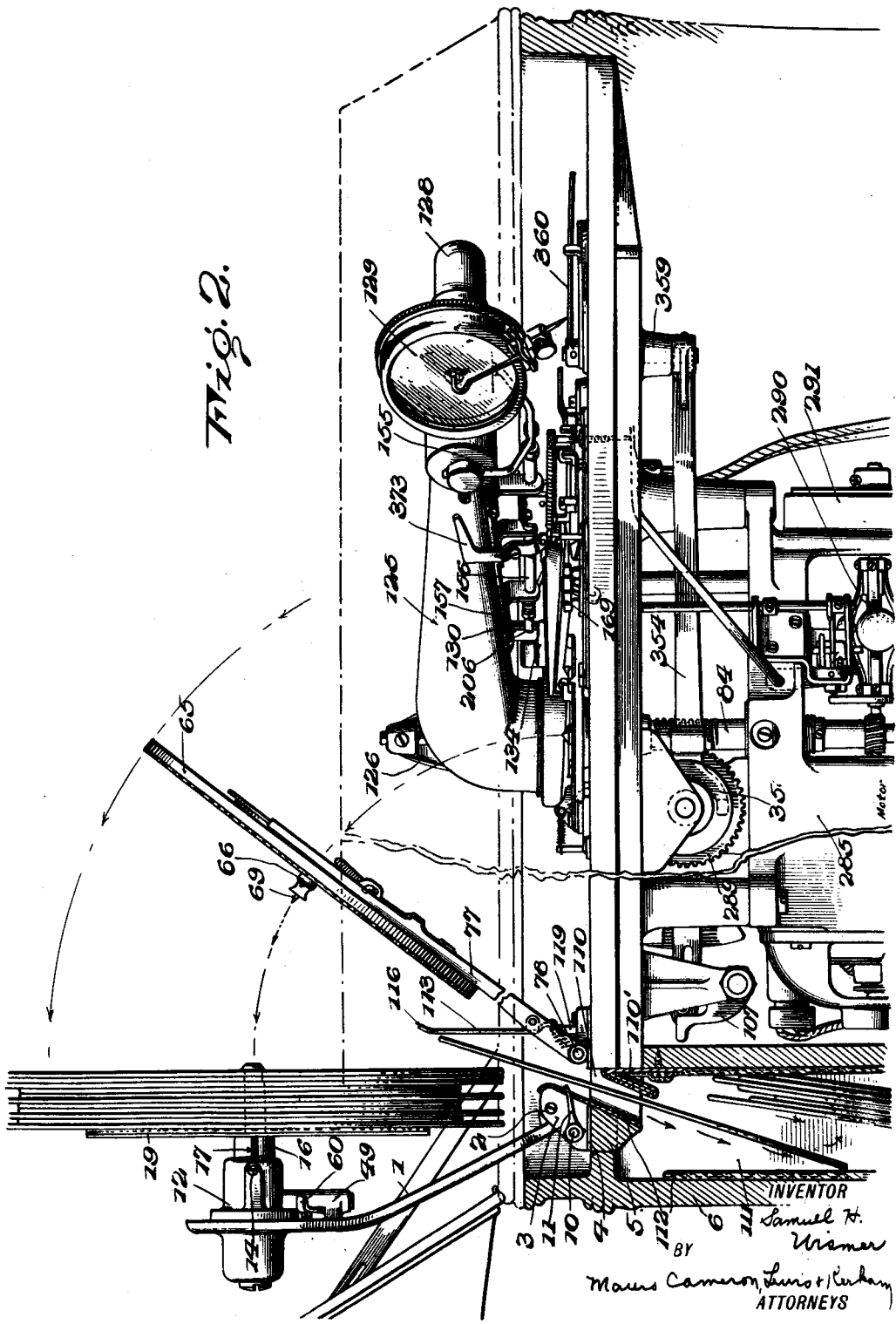

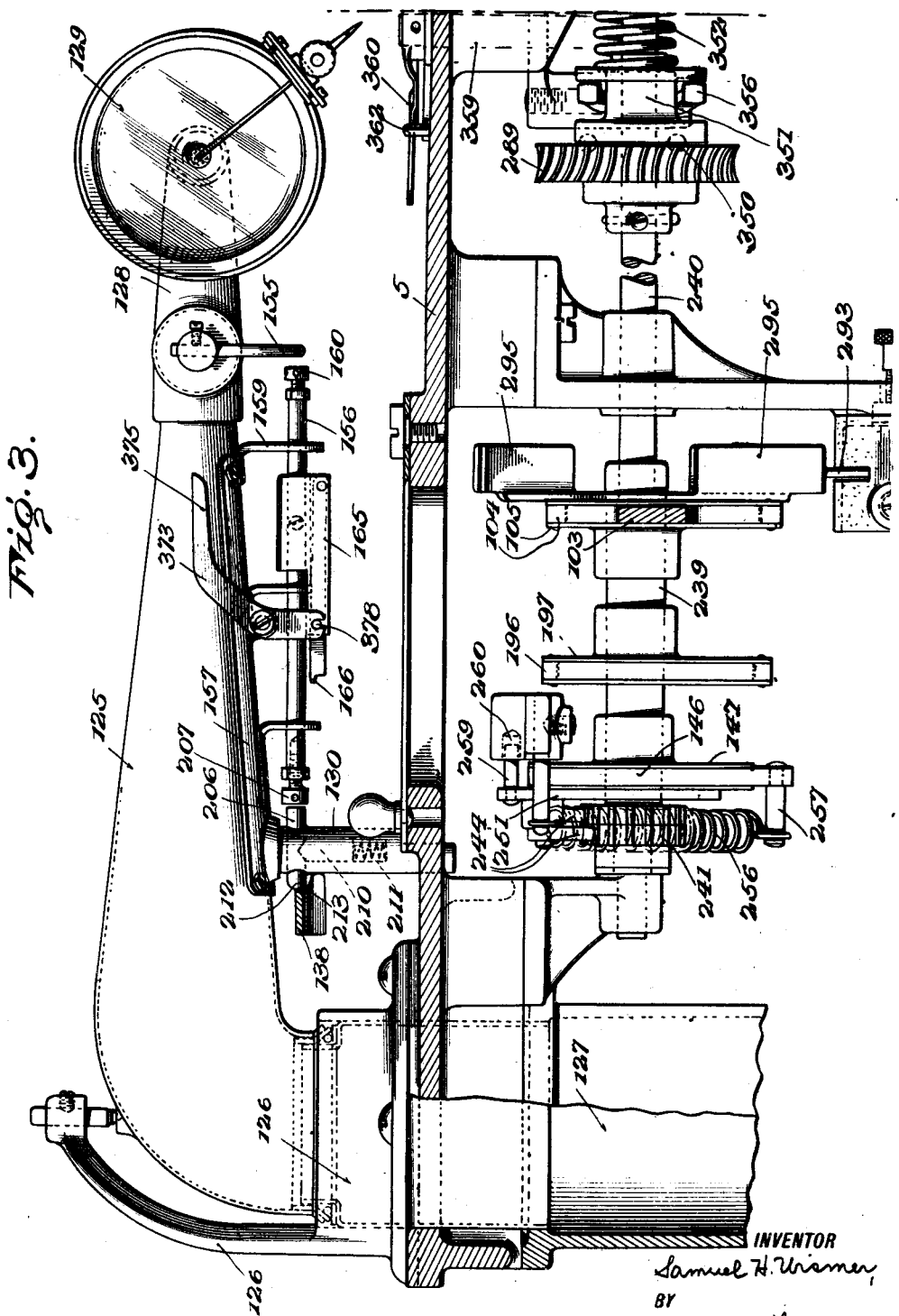

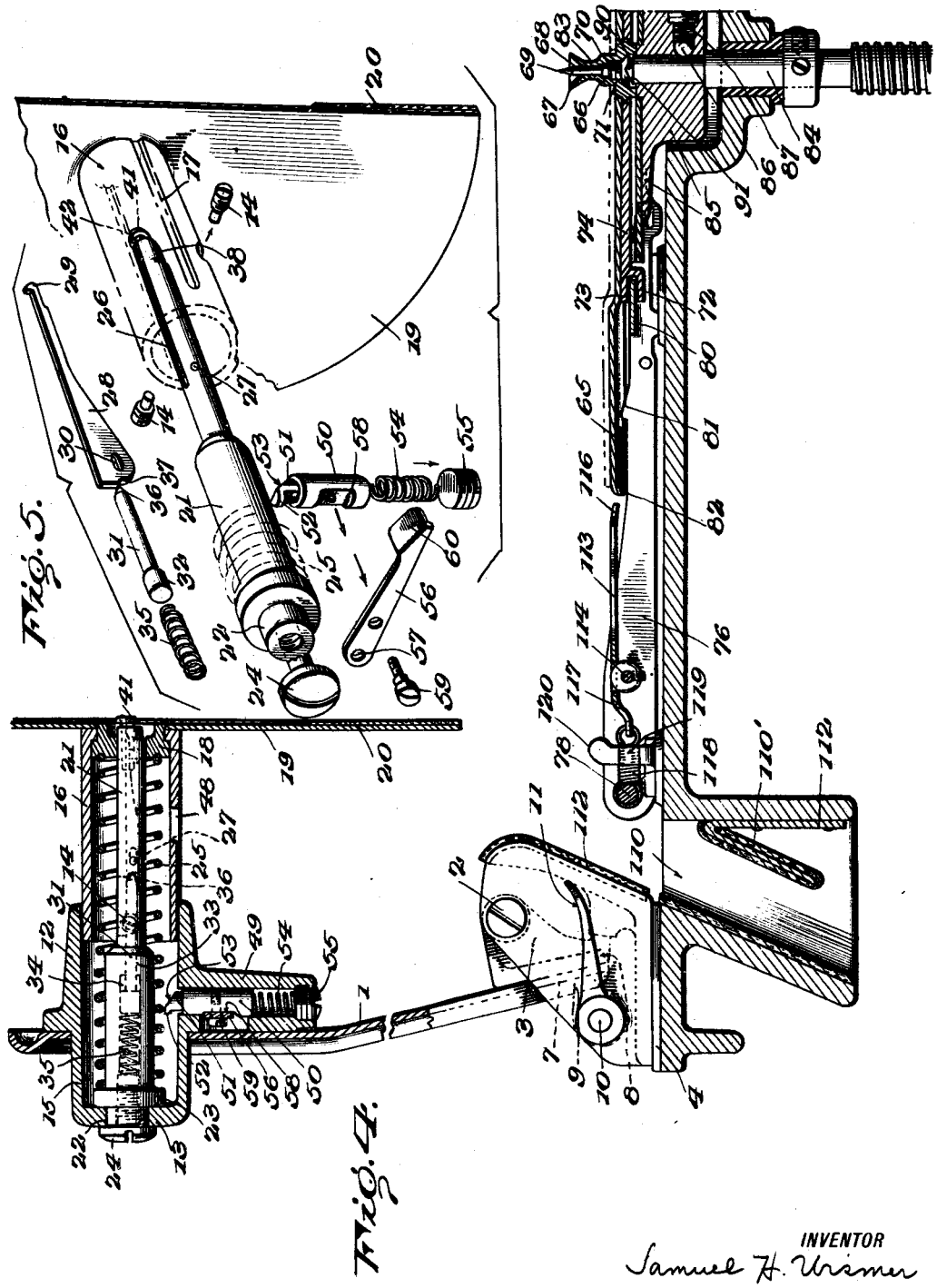

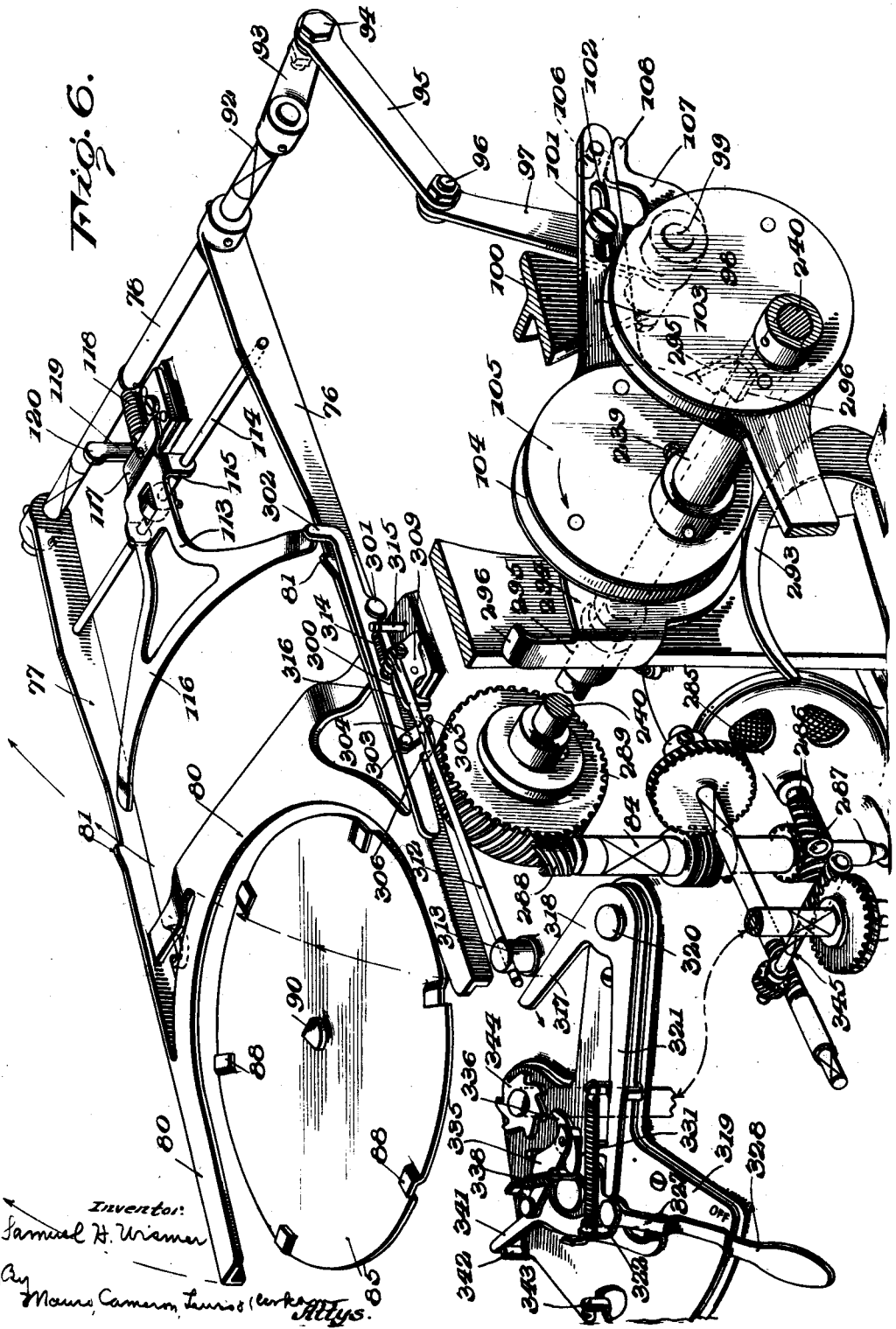

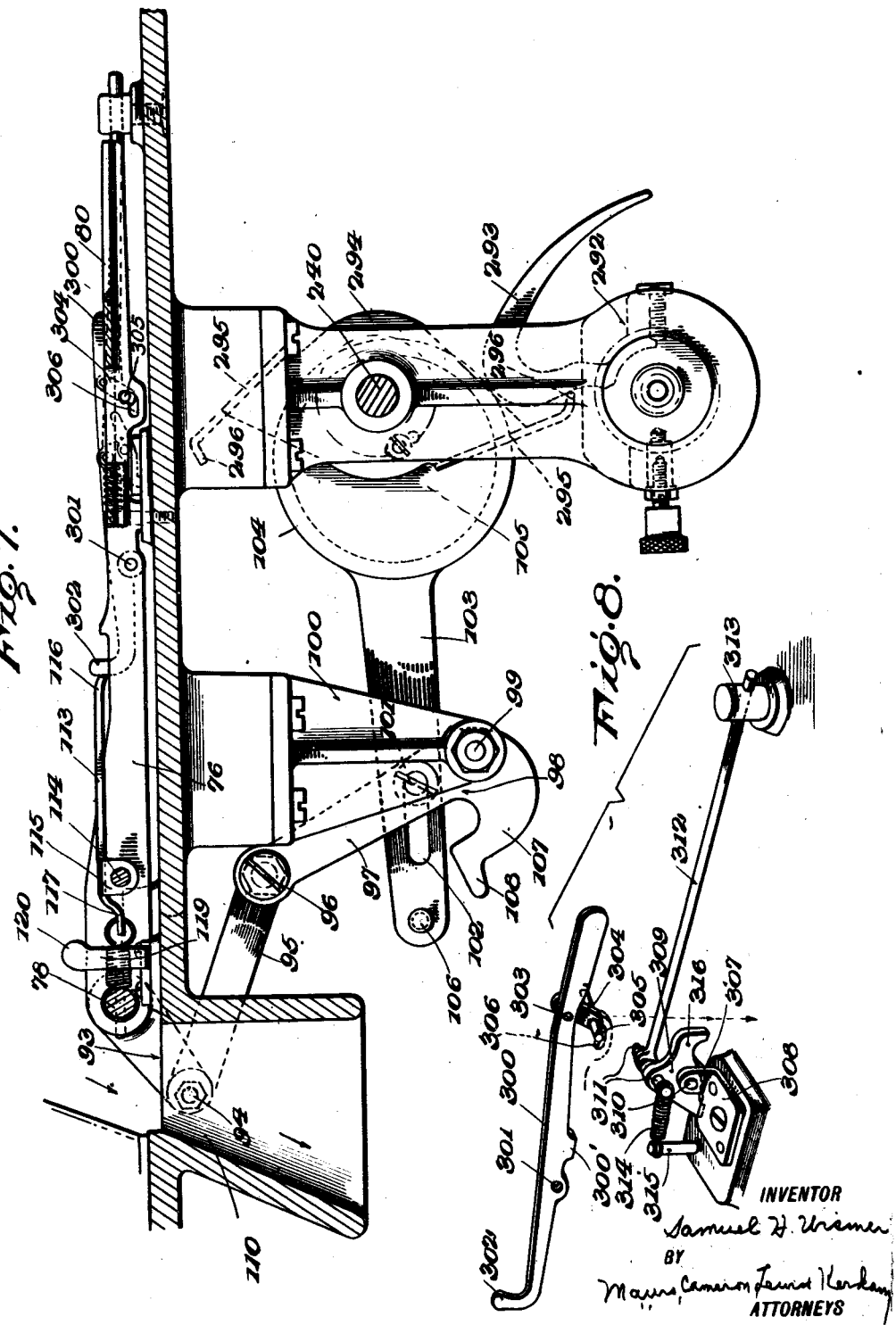

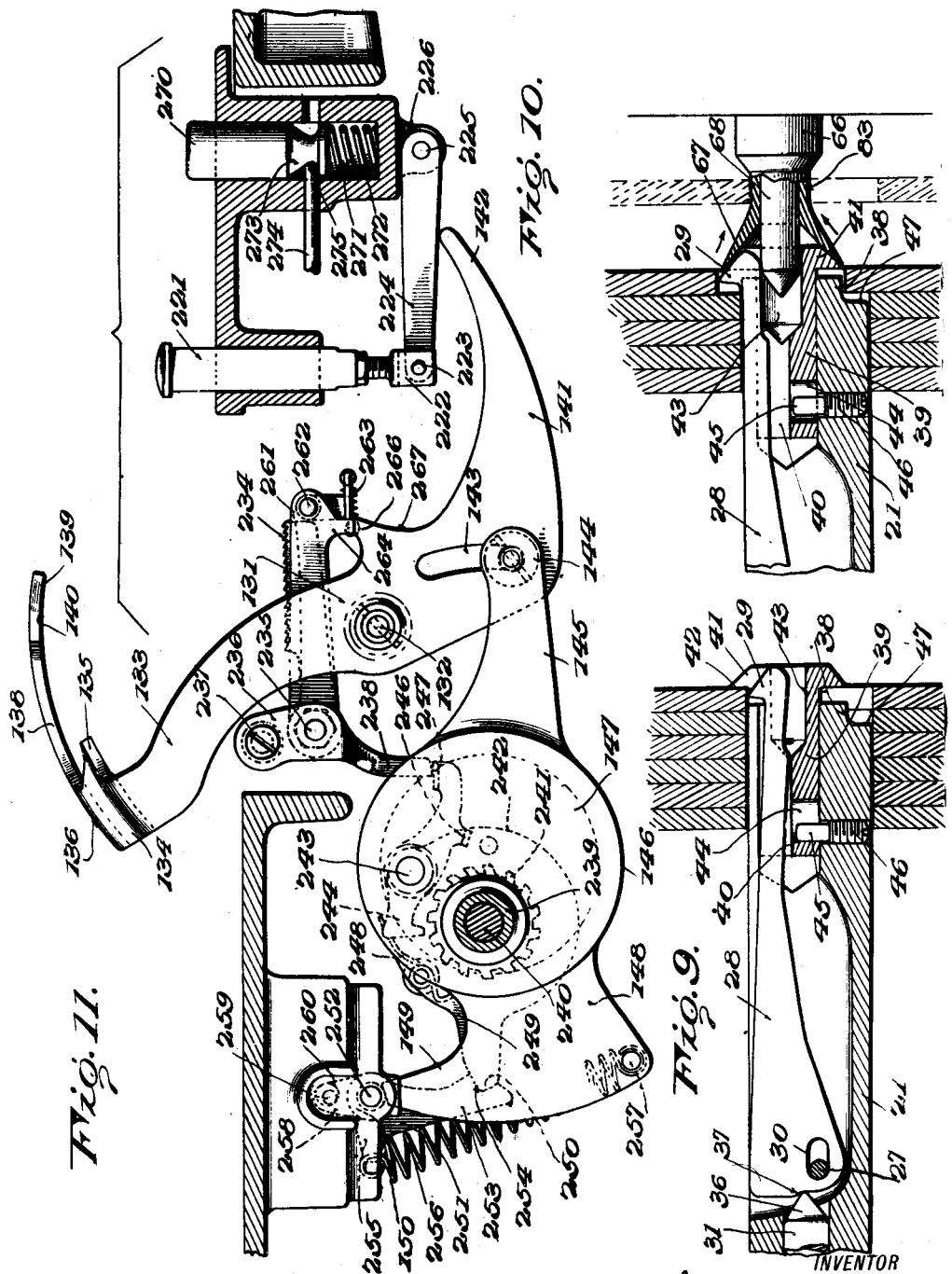

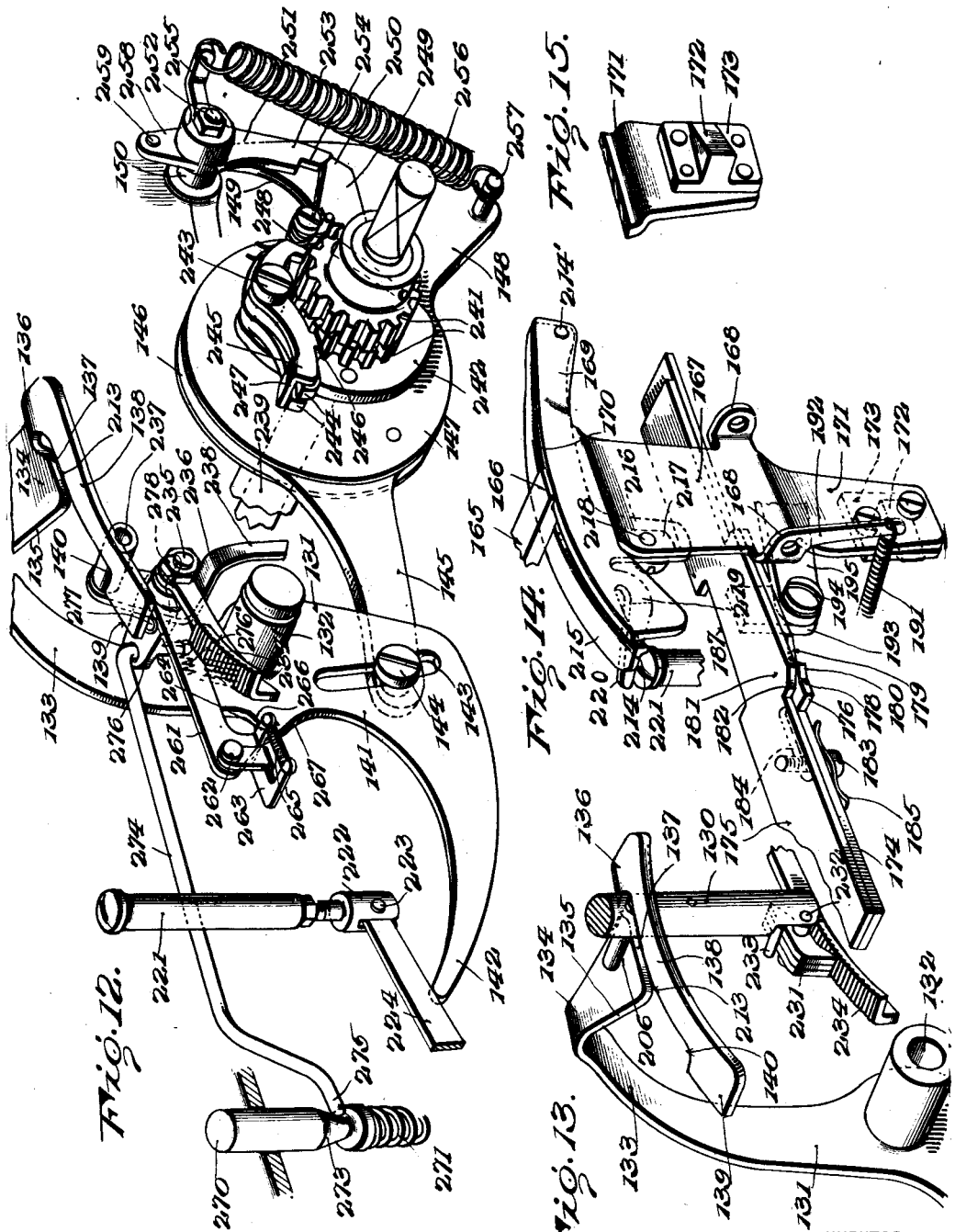

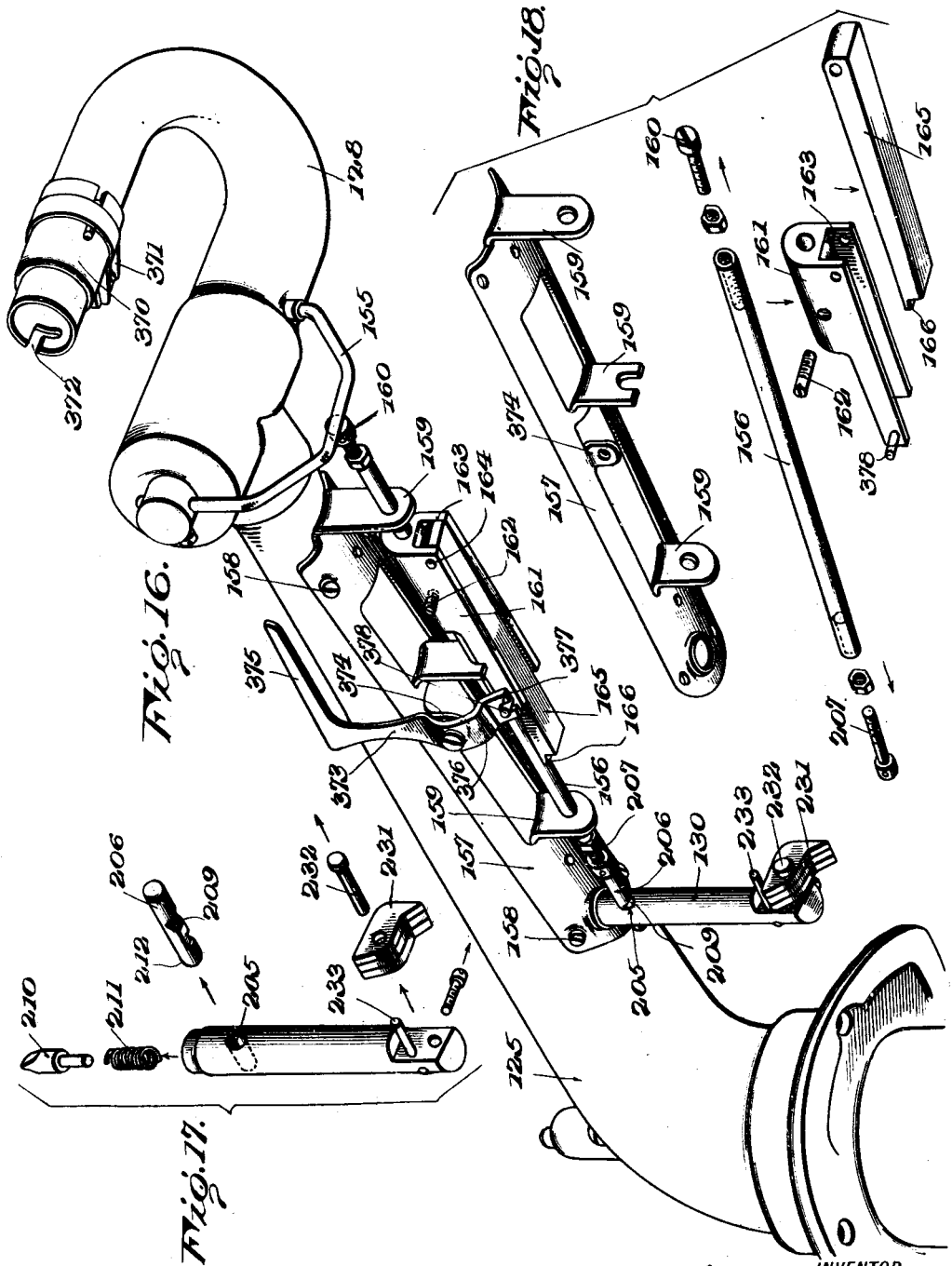

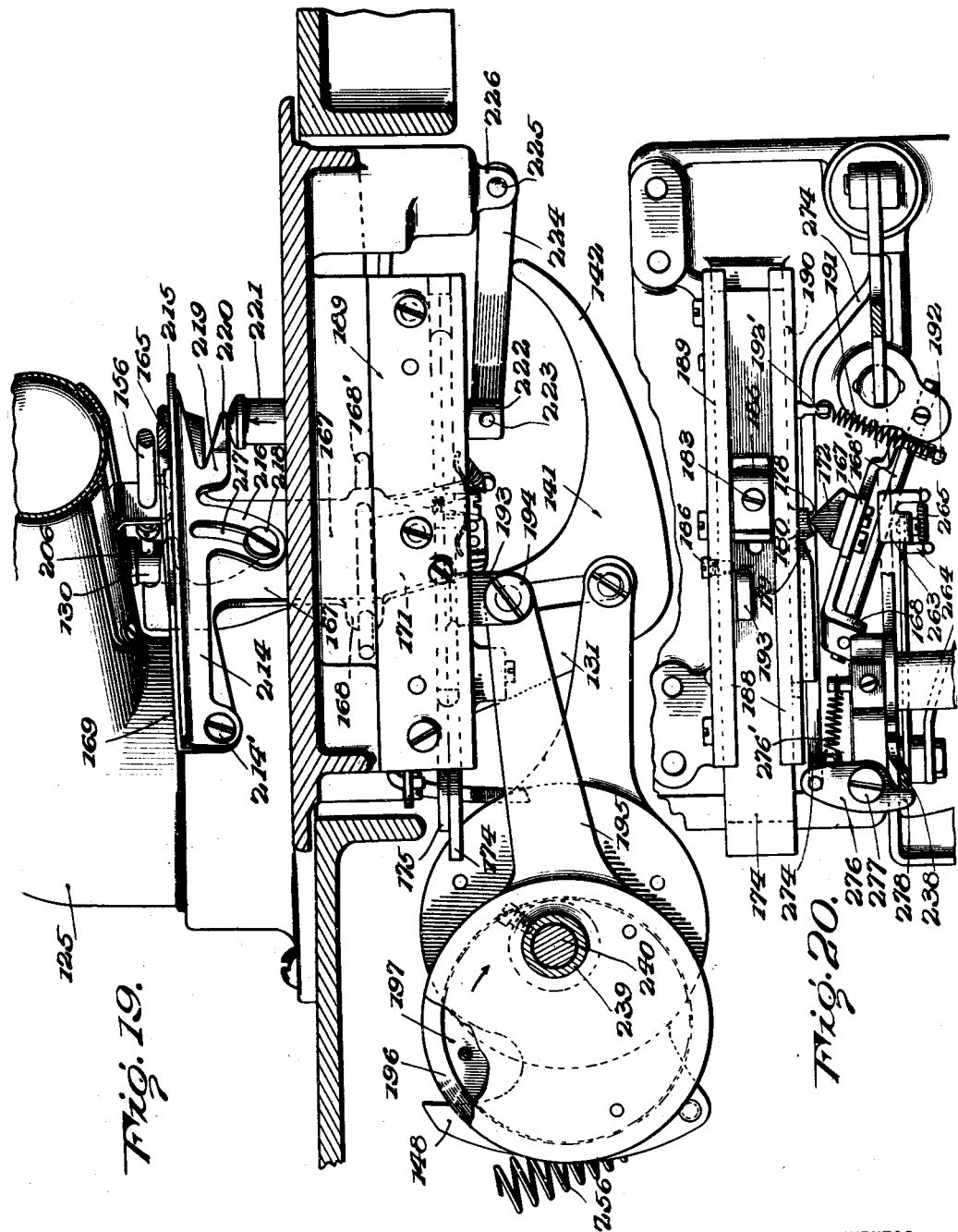

Oct. 18, 1932.  S. H. WISMER  1,883,239
SOUND REPRODUCING MACHINE
Original Filed April 14, 1924  12 Sheets-Sheet 11
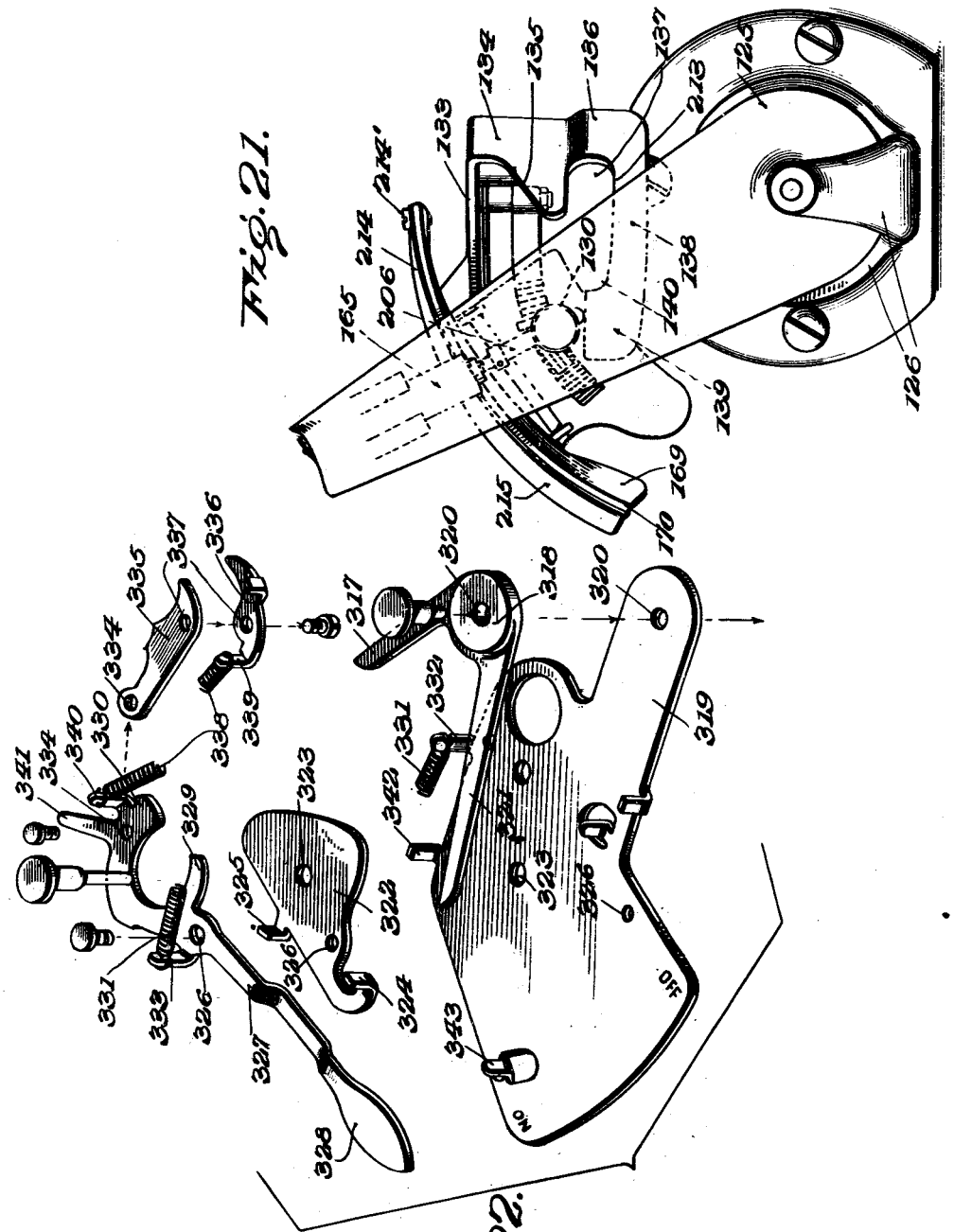
INVENTOR
Samuel H. Wismer
BY
Mauro, Cameron, Lewis & Kerkam
ATTORNEYS Oct. 18, 1932.  S. H. WISMER  1,883,239
SOUND REPRODUCING MACHINE
Original Filed April 14, 1924   12 Sheets-Sheet 12
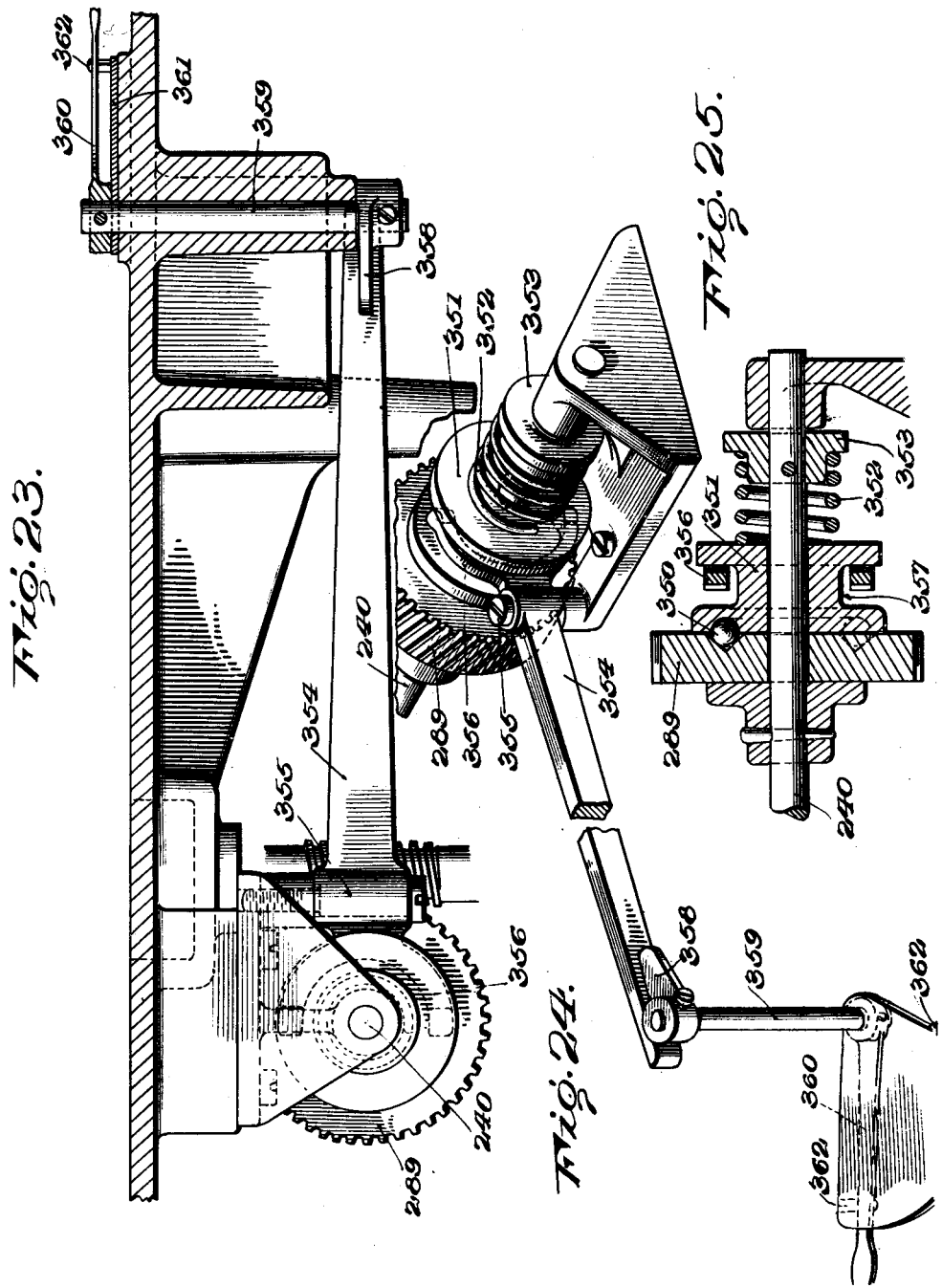
INVENTOR
Samuel H. Wismer
BY
Mauro, Cameron, Lewis & Kerkam
ATTORNEYS Patented Oct. 18, 1932

1,883,239

UNITED STATES PATENT OFFICE

SAMUEL H. WISMER, OF PALMYRA, NEW JERSEY, ASSIGNOR, BY MESNE ASSIGNMENTS, TO RADIO CORPORATION OF AMERICA, OF NEW YORK, N. Y., A CORPORATION OF DELAWARE

SOUND REPRODUCING MACHINE

Application filed April 14, 1924, Serial No. 706,530. Renewed January 29, 1932.

This invention relates to sound reproducing machines and, more particularly, to machines for reproducing sound from disk record tablets.

It has heretofore been proposed to provide a sound reproducing machine designed to play a plurality of record tablets in succession automatically with means for automatically moving the sound reproducing instrumentalities to the starting position for tablets of either 10 or 12 inch diameter controlled or operated by the movement of the tablet into playing position. Devices of this character, however, are more or less impositive in action and are not available for use in machines which are not designed to transfer tablets into and out of playing position. It has also been proposed to provide the sound reproducer with a carriage and feed mechanism for moving the reproducer into starting position with respect to a tablet, said feed mechanism being thrown out of operation automatically by the engagement of an element on the reproducer with the periphery of the tablet. Devices of this character, however, are bulky and complicated.

It is an object of this invention to provide a sound reproducing machine with improved means for automatically moving the sound reproducing instrumentalities to the starting position for tablets of different diameters which is available for use on machines containing no provision for automatically changing the record tablets as well as on machines provided with means for effecting this function, and which is simple in construction and efficient and positive in action.

Another object of this invention is to provide a sound reproducing machine with improved means for moving the sound reproducing instrumentalities automatically to the starting position for tablets of different diameters which requires no manual adjustment so that, when used on a machine containing no provision for changing the record tablets, as well as when used on a machine containing such a provision, said returning means will operate to position the reproducing instrumentalities at the beginning of the record tablet in playing position whether it be of one diameter or another, without any previous attention, manipulation, or adjustment.

Other objects of this invention are to provide a sound reproducing machine with means for returning the sound reproducing instrumentalities from the end of a record to the starting positions for tablets of different diameters and means under the control of the movement of said instrumentalities toward the plane of the record tablet for determining the extent of said returning movement; to provide means for returning the sound reproducing instrumentalities to the starting positions for tablets of a predetermined diameter and means actuated by the failure of said instrumentalities to engage a tablet in said position whereby said instrumentalities are moved to another starting position.

Another object of this invention is to provide a sound reproducing machine with means for automatically returning the sound reproducing instrumentalities to the starting positions for tablets of different diameters together with means actuated by a reverse movement of said instrumentalities for initiating the operation of said returning means.

Another object of this invention is to provide a sound reproducing machine designed to move a plurality of record tablets, of different diameters and arranged in any desired order, into coöperative relation with sound reproducing instrumentalities, with means of the character described for returning said instrumentalities automatically to the starting positions for said tablets of different diameters so that without adjustment tablets of different diameters arranged in any desired order may be automatically reproduced in succession.

Other objects of this invention are to provide a sound reproducing machine designed to reproduce a plurality of record tablets in succession automatically, and including means for changing the tablets and for returning the sound reproducing instrumentalities to starting position, with improved means for manually initiating the movement of said automatic devices to the end that the tablets may be changed and the reproducing instrumentalities returned to starting position without waiting for the completion of the reproduction of sound from a tablet in playing position; to provide a machine designed to reproduce a plurality of record tablets in succession automatically, and including means for changing the tablets and for returning the sound reproducing instrumentalities to starting position, with means whereby said automatic devices may be thrown out of operation and the machine used as a non-automatic machine.

Other objects will appear as the description of the invention proceeds.

Stated generally, the present invention provides means for disengaging the sound reproducing instrumentalities from a record tablet at the end of the record and returning the same to starting position, and means under the control of the movement of said instrumentalities toward the plane of the record tablet for determining the extent of said returning movement, to the end that said instrumentalities may be automatically positioned at the beginning of record on tablets of different diameters, means being provided whereby said instrumentalities move toward the plane of the tablet at the starting positions for tablets of different diameters and means being actuated by the failure of said instrumentalities to engage a tablet in one of said positions whereby said instrumentalities are moved to the starting position for tablets of a different diameter. Said automatic means for returning the sound reproducing instrumentalities to the starting positions for tablets of different diameters, although capable of use in machines containing no provision for automatically changing the record tablets, are here shown as combined with means for successively and automatically moving a plurality of record tablets of different diameters and arranged in any desired order into cooperative relation with said sound reproducing instrumentalities. In either event, said means for automatically returning the sound reproducing instrumentalities to starting position are retained out of operation during the sound reproducing movement of said instrumentalities, and means actuated by a reverse movement of said instrumentalities are preferably provided for initiating the operation of said returning means. The present invention also provides a machine for reproducing a plurality of record tablets in succession automatically—including automatic means for changing the tablets and returning the sound reproducing instrumentalities to starting position and having means automatically tripped by the movement of said instrumentalities for initiating the operation of said automatic devices—which is also provided with manual means for actuating said trip mechanism; also a machine provided with automatic means for changing the tablets and returning the sound reproducing instrumentalities to starting position which is also provided with means for throwing said automatic devices out of operation so that the machine may be used as a non-automatic machine.

The invention is capable of receiving a variety of mechanical expressions only one of which has been shown on the accompanying drawings, but it is to be expressly understood that the drawings are for purposes of illustration only and not to be construed as a definition of the limits of the invention, reference being had to the appended claims for that purpose.

In said drawings, wherein the same reference characters are employed to designate corresponding parts in the several figures,—

Fig. 2 is a side elevation of said machine, certain of the parts being shown in section for clearance of illustration;

Fig. 3 is a vertical section showing the sound reproducing instrumentalities, with the parts carried thereby, and the countershaft, with the several elements mounted thereon, in side elevation;

Fig. 4 is a vertical section through the tablet magazine and tablet-transfer device;

Fig. 5 is a perspective view of component parts of the tablet magazine drawn apart for clearness of illustration;

Fig. 6 is a perspective view of the tablet-transfer and tablet-discharging devices and the automatic stop mechanism, with parts displaced laterally for clearness of illustration;

Fig. 7 is a side elevation of the tablet-transfer device showing the means for actuating the stop mechanism carried thereby;

Fig. 8 is a perspective view of component parts of the device for actuating the stop mechanism drawn apart for clearness of illustration;

Fig. 9 is an enlarged fragmentary axial section through the tablet-supporting member of the magazine;

Fig. 10 is a corresponding fragmentary view illustrating the release of a tablet from the magazine by the center post of the table;

Fig. 11 is a transverse section showing the tone-arm returning lever and associated parts in side elevation;

Fig. 12 is a perspective view of the tone-arm returning lever and the trip mechanism with parts displaced laterally for clearness of illustration;

Fig. 13 is a perspective view of the tone-arm returning lever showing its manner of cooperation with the depending post on the Fig. 14 is a perspective view of the lever for elevating and lowering the reproducer and the plate cams for operating the same;

Fig. 15 is a perspective view of the cam follower on the last-named lever;

Fig. 16 is a perspective view from below of the various instrumentalities carried on the tone-arm;

Fig. 17 is a perspective view of the post carried by the tone-arm and the parts carried thereby drawn apart for clearness of illustration;

Fig. 18 is a perspective view of the parts carried on the under side of the tone-arm drawn apart for clearness of illustration;

Fig. 19 is a transverse section showing in elevation the apron and pivoted track and associated operating devices;

Fig. 20 is a bottom plan view of the plate-like cam members and the associated lever for elevating and lowering the reproducer;

Fig. 21 is a top plan view of the tone-arm with its associated mechanism for returning the tone-arm and elevating and lowering the reproducer;

Fig. 22 is a perspective view of the stop mechanism with the parts drawn apart for clearness of illustration;

Fig. 23 is a side view of the clutch and its operating device;

Fig. 24 is a perspective view of the clutch and its operating device turned upside down; and Fig. 25 is an axial section through the clutch.

Figure 1:
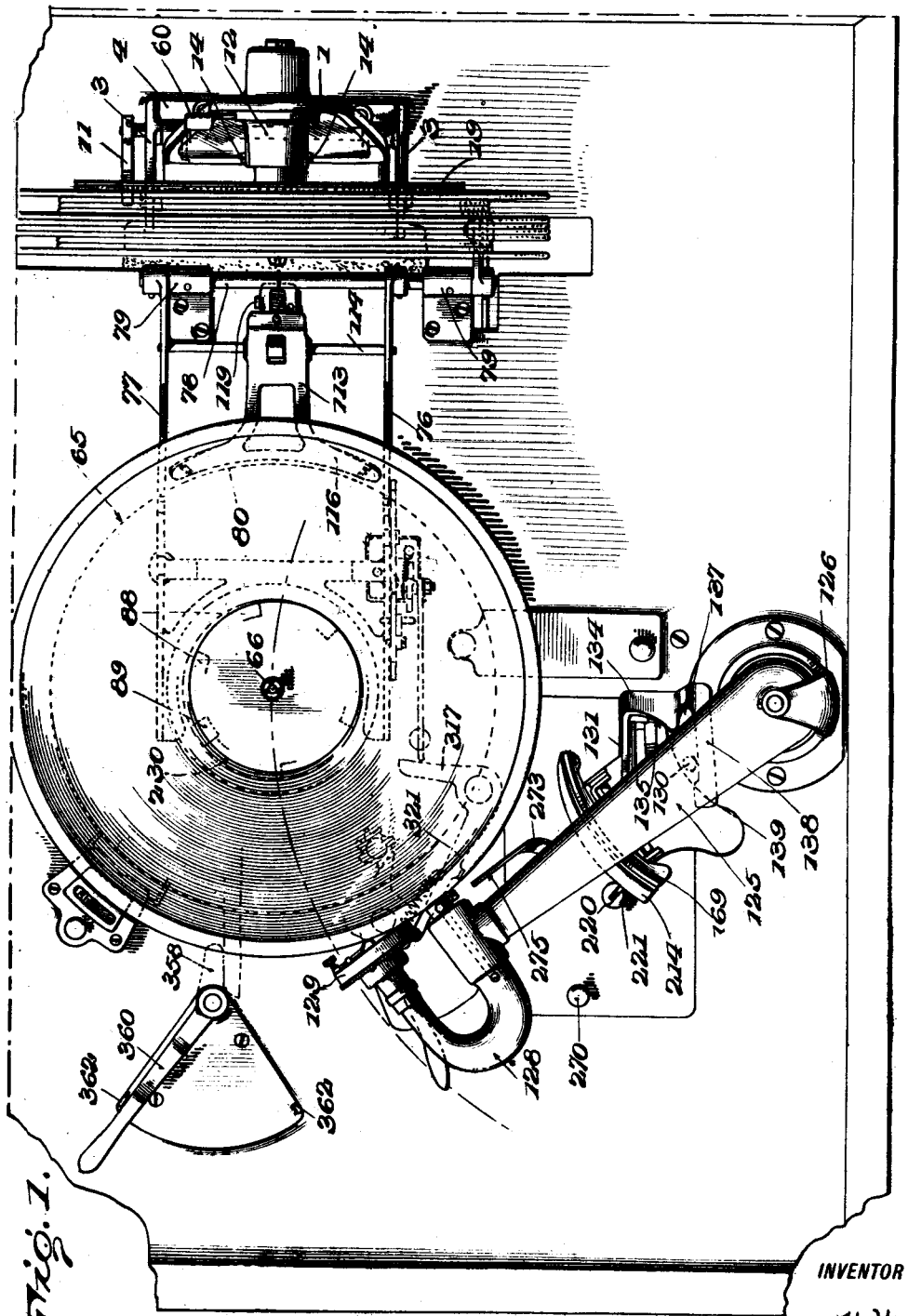
Fig. 1 is a plan view of a sound reproducing machine embodying the present invention.

Tablet magazine (Figs. 1, 2, 4, 5, 9 and 10).

In conformity with the present invention, means are provided for supporting a plurality of record tablets in position for transfer into cooperative relation with sound reproducing instrumentalities. While, as respects certain features of this invention, said means may be of any suitable construction and arranged in any suitable manner, said means are preferably so constructed as to support record tablets of either large or small diameter, e. g. either the standard 12 or 10 inch tablets, in any desired order, and are so arranged as to support said tablets in a substantially vertical position for transfer of the tablets successively into cooperative relation with the sound reproducing instrumentalities.

In the form shown, an upright bracket 1 is provided, and by preference pivotally mounted in any suitable way, as by pintles or pivot screws 2, in the upstanding side members 3 of a bracket plate 4 suitably mounted on any desired support, as the top wall 5 of a cabinet 6. Any suitable means may be provided for retaining the bracket in its upright position; in the form shown, said bracket 1 extends below its pivotal axis 2 as shown at 7 (Fig. 4), and said extension is retained against a fixed abutment 8 on the bracket plate 4 by a laterally extending arm 9 projecting from a stub shaft 10 which is also rotatably mounted in one of the upstanding side members of said bracket plate. The outer end of said stub shaft 10 carries a second arm 11 by which the stub shaft, and therefore the arm 9, may be rotated into and out of operative position for locking the bracket 1 in its upright position. If arm 11 is rotated in an anti-clockwise direction, stub shaft 10 and arm 9 are rotated in the same direction, and the bracket 1 is therefore freed from its abutment 8 so that it may be swung about its axis 2 into a substantially horizontal position, in which position it may be enclosed by the cover of the cabinet 6. When the magazine is to be placed in operative position, the bracket 1 may be swung about its axis 2 into the upright position and locked therein by moving the arm 11 in a clockwise direction to rotate the arm 9 into engagement with the depending extension 7 of said bracket and press the latter firmly against its abutment 8.

Suitably mounted on the upper end of said bracket 1 is a sleeve 12 (see Fig. 4) closed at its outer end 13 and carrying on opposed sides thereof a pair of pins or screws 14 which project into the hollow bore 15 of said sleeve. Reciprocably mounted in the bore 15 of said sleeve is a second sleeve 16 provided on the opposite sides thereof with longitudinally extending grooves or slots 17 (Fig. 5) to receive the inwardly projecting ends of said screws 14, whereby the sleeve 16 may reciprocate longitudinally within the sleeve 12 but may not rotate with respect thereto, said grooves or slots 17 being shown as closed at their inner ends to provide a stop for the outward movement of said sleeve 16. The outer end of the sleeve 16 is provided with an inwardly directed flange which may take the form of a centrally apertured block 18 suitably secured within the end of the sleeve 16, and mounted on the outer end of said sleeve 16 is a centrally apertured plate or disk 19 which may be of any suitable diameter but which is preferably of sufficient size to afford a relatively large area of contact with a record tablet. If desired, said plate may be provided with a facing 20 of any suitable soft material, such as felt.

Mounted within the sleeves 12 and 16 is an axially extending tubular post 21 which is reduced in external diameter at its forward end to substantially the size of the center holes of standard record tablets. Said post may be supported within said sleeves in any suitable way; in the form shown said post has an outer end 22 which fits within a corresponding aperture in the end 13 of the sleeve 12 and a flange 23 which may be drawn against the inner face of said end wall 13, and clamped in position, by a screw 24 threaded into the end of said post and provided with a large head for engagement with the other face of said wall 13. Surrounding said post 21 is a coil spring 25 which abuts against the flange or block 18 at one end and the flange 23 at its other end, whereby said spring normally operates to urge the sleeve 16 forwardly to a position wherein it is projected to its maximum extent from the sleeve 12.

The outer end of the tubular post 21 is provided with a longitudinal slot 26 (see Fig. 5), and pivoted within said slot on a transverse pin 27 is a lever 28 the forward end of which projects beyond the outer end of the tubular post 21 and is there provided with an upstanding toe 29. Said lever 28 has an elongated slot 30 at its inner end to receive the pivot pin 27 and permit some freedom of movement of said lever on said pin. Said lever 28 is normally urged into such a position that the toe 29 on the outer end of said lever is depressed, so that it does not project beyond the peripheral surface of the tubular post 21. To this end, a plunger 31 having an enlarged head 32 is reciprocably mounted in the tubular bore 33 of the post 21, said bore being enlarged as shown at 34 to receive said head 32 and a coil spring 35 which reacts between said head 32 and the inner end of the screw 24 or other suitable abutment. The end of said plunger 31 is tapered as shown at 36 and cooperates with an inclined surface 37 on the inner end of the lever 28. Said surface 37 is so related to the axis of pivotal movement of said lever 28 that said lever is urged in a clockwise direction into depressed position by the forward pressure of the plunger 31, under the action of the spring 35, on the inner end of said lever.

The outer end of the post 21 is formed eccentric with respect to the body of the post as shown at 38 (Figs. 9 and 10) and reciprocably mounted within the outer end of said post but concentrically with respect to the eccentric portion 38 thereof, is a short plunger 39 which is slotted longitudinally thereof, as shown at 40, to receive the outer end of the lever 28. Plunger 39 is provided with a head 41 which is beveled on its forward face, and said head, owing to its eccentric relation to the body of the post 21, provides a shoulder 42 which projects above the said post. Said plunger 39 also has a longitudinally-extending recess 43 which normally contains the toe 29 on the lever 28. Plunger 39 has a limited reciprocating movement within the post 21 and to this end is provided with a slot 44 which receives the projecting end 45 of a screw 46 threaded into an aperture in said post. This slot 44 is so designed that when its inner end (its left hand end as viewed in Fig. 9) is in engagement with the inner end 45 of the screw 46, the head 41 of the plunger 39 is spaced a short distance from the end of the post 21, this distance however being always less than the thickness of any record tablet to be mounted on said post. The eccentric projection 38 on the end of the post 21 is of such length that the distance between the shoulder 47, between said eccentric portion and the main body of said post, and the shoulder 42 on the head 41 is greater than the thickness of any record tablet to be mounted on said post but less than the thickness of any two tablets to be mounted on said post.

When record tablets are to be positioned in the magazine so far described, pressure is applied to the face of the disk 19 to telescope the sleeve 16 within the sleeve 12 to its farthest extent. The sleeve 16 and disk 19 may be retained in this innermost position in any suitable way; in the form shown, the sleeve 16 is provided on its under side with a slot 48, and mounted within a tubular extension 49 on the sleeve 12 is a plunger 50 provided with a head 51 having an overhung lip 52 and an inclined surface 53. Said plunger is normally urged upwardly by a coil spring 54 retained within the tubular bore of said extension 49 and reacting between the end of the plunger 50 and a screw 55 threaded into the lower end of said bore. As the sleeve 16 is telescoped into the sleeve 12, its inner end engages the beveled surface 53 on the head 51 and depresses the plunger 50 against the tension of the spring 54 until the slot 48 is brought into alignment with said head, whereupon the spring 54 forces the plunger 50 upwardly and the head 51 enters the slot 48 and prevents the sleeve 16 and disk 19 from being forced outwardly by the coil spring 25. In this position the reduced end of the tubular post 21 projects forwardly of the disk 19 to an extent sufficient to receive the desired number of record tablets, which may be slipped onto said post from its outer end.

When the desired number of tablets have been slipped onto the projecting end of the post 21, the sleeve 16 is released from the head 51 in any suitable way. In the form shown a lever 56 is pivoted at 57 (Fig. 5) on the extension 49 and is received in a lateral slot 58 in the plunger 50, and retained therein by a screw 59, said lever being provided with an outwardly extending thumb piece 60, whereby upon depression of said lever 56 the plunger 50 is depressed and the head 51 withdrawn through the slot 48. Owing to the overhanging lip 52, however, the head 51 of plunger 50 can be withdrawn through the slot 48 only in the event that pressure is first applied to the face of the tablets on the post 21 so as to move the sleeve 16 against the tension of the spring 25 inwardly a slight distance. This ensures that the hand shall be upon the face of the tablets at the time that the sleeve 16 and disk 19 are released to be moved by the action of the spring 25, as a precaution that the sudden expansion of the spring 25 shall not shoot the tablets off of the post 21 or injure the foremost tablet by hard impact with the shoulder 42 on the head 41.

The spring 25 presses the disk 19 and the series of tablets forwardly until the foremost tablet is in engagement with the shoulder 42 which, projecting beyond the peripheral surface of the post 21, acts as a detent or stop to prevent the tablets being forced off of the post. It will be perceived, however, that as the foremost tablet is removed from the post the spring 25 presses the disk 19 and the remaining tablets on said post forwardly until the next successive tablet contacts with the said shoulder 42.

Tablet-transfer mechanism. (Figs. 1, 2, 4, 6, 7 and 10.)

In conformity with the present invention, means are provided for automatically transferring tablets from the magazine heretofore described into cooperative relation with sound reproducing instrumentalities. While, as respects certain features of this invention, any suitable tablet transferring mechanism may be employed, the preferred construction comprises a record transfer device which swings through an angle of approximately 90° and by a single oscillation through said angle automatically picks up the foremost tablet in the magazine and conveys it into a substantially horizontal position, said transfer device also preferably supporting the tablet in cooperative relation with said sound reproducing instrumentalities during the reproduction of sound.

In the form shown, the record transfer device comprises a table 65 provided with a center post 66 which has a flared conical outer end 67, said post being preferably of substantially the same diameter as the central hole in standard record tablets. Mounted within said center post 66 is a pin 68 having a conical outwardly projecting end 69 coaxial with the flared conical end 67 of said post. Said pin 68 may be retained in position in any suitable way, being shown as provided with an enlarged head 70 threaded into a recess 71 in the post 66. Mounted on the under side of the table 65, or formed integrally therewith, is a peripheral or radially extending flange 72 shown as formed by a circumferential slot 73 in the periphery of a disk 74 suitably attached to the under side of the table 65.

Table 65 is designed to be swung from a substantially horizontal position into a substantially vertical position parallel to the tablets in the magazine and with its center post 66 in substantial alignment with the central hole of the foremost tablet. To this end said table 65 is carried by a frame oscillatably mounted on any suitable support, as a part of the cabinet. In the form shown, said frame comprises a pair of arms 76 and 77 suitably attached to a rotatable shaft 78 mounted in any suitable way as in bearing sleeves 79 (see Fig. 1) on the cabinet. The outer end of said frame carries, or has formed integral therewith, a semi-circular flange or member 80 which is designed to be received in the peripheral slot 73 in the flange 72 under the table 65. As the frame 76, 77 is swung by rotation of the shaft 78 from a substantially horizontal to a substantially vertical position, the flange 80 by engagement in the peripheral slot 73 carries the table 65 into a substantially vertical position. In order to prevent the table 65 from being thrown outwardly and off of the flange 80 by centrifugal force as the frame is swung upwardly, the arms 76 and 77 of said frame are preferably provided with upstanding lugs or pins 81 positioned to engage a depending peripheral flange 82 on the table and prevent excessive outward movement thereof should the table start to leave the flange 80.

When the table is swung into a vertical position by the frame 76, 77, it is in substantial alignment with and substantially parallel to the tablets on the post 21, and the conical end 69 of the pin 68 is thrust into the recess 43 in the plunger 39 to force the outer end of the lever 28 upwardly (see Fig. 10). In this position, the table 65 is centered coaxially with the plunger 39 by the engagement of the conically flared end 67 of the post 66 with the beveled outer surface of the head 41. When the lever 28 is forced upwardly, the foremost tablet on the post 21 is engaged by the toe 29 on said lever 28 and lifted from its position wherein it is concentric with the body of the post 21 into a position wherein it is concentric with the eccentric head 41 of the plunger 39, this movement being permitted by the eccentric extremity 38 of said post 21. The spring 25, acting through the disk 19 and the series of record tablets, thereupon presses the foremost tablet off of the post 21 over the head 41 and onto the center post 66 of the table. Said post is preferably reduced in diameter intermediate of its length, as shown at 83, and the tablet received on the post 66 as just described will therefore slide into the portion of reduced diameter, as shown in dotted lines in Fig. 10. As the table returns to horizontal position the tablet will be carried therewith and be properly centered on the table by the post 66.

As heretofore pointed out, the table 65 is preferably utilized to support the tablet while in cooperative relation with the sound reproducing instrumentalities to effect the reproduction of sound and, to this end, means are provided whereby the table 65 is rotated when returned to horizontal position. In the form shown, the turn table shaft 84 carries on its upper end a sub-table 85, said sub-table being preferably held in frictional engagement with the shaft 84 in any suitable way, as by a suitable ball clutch schematically indicated in Fig. 4 and including one or more balls 86 carried in one or more recesses in the hub of the sub-table 85 and normally pressed by one or more springs 87 into clutch engagement with the surface of the turn table shaft.

The upper surface of the sub-table 85 is provided with one or more, preferably a plurality of, upstanding lugs 88, which may be conveniently pressed upwardly from the disk-like body of the sub-table as clearly shown in Fig. 6. The under side of the turn table 65 is provided with one or more depending lugs 89 (shown in dotted lines in Fig. 1) in circumferential alignment with the lugs 88 when said table 65 is in engagement with the sub-table 85, so that in the latter position a lug 88 will engage the lug 89 and positively rotate the table 65. The upper end of the turn table shaft 84 preferably projects above the surface of the subtable 85, as shown at 90, so as to center the table 65, and the under side of the table 65, or the center post 66, is accordingly recessed as shown at 91 in Fig. 4 to receive said projecting end 90.

Any suitable means may be provided for oscillating the shaft 78 to effect the heretofore described movement of the frame 76, 77, 80. In the form shown, shaft 78 is extended at one end beyond its bearing sleeve 79, as shown at 92 in Fig. 6, and is there provided with a crank arm 93 to which is pivotally connected, at 94, a link 95. Said pivot 94 preferably takes the form of an eccentric bolt (see Fig. 7) so that by rotation of said bolt, the extent of movement of the crank arm 93 may be nicely adjusted. Link 95 is pivotally connected at 96 to the long arm 97 of a bell crank lever 98 pivotally mounted at 99 on any suitable part of the frame, as a depending lug 100. Projecting from the arm 97 of said bell crank lever is a pin or screw 101 which is received within an elongated slot 102 in an arm 103 projecting from an eccentric strap 104 cooperating with an eccentric 105. The outer end of arm 103 is provided with a lateral pin 106 which is adapted to engage the short arm 107 of said bell crank lever 98. The upper end of said arm 107 is provided with a lateral extension 108 which is of such extent that the pin 106 may never move beyond the outer extremity thereof.

As eccentric 105 rotates in an anti-clockwise direction as viewed in Fig. 6 the strap 104 is actuated to move the arm 103 toward the left as viewed in said figure, and when the end of the slot 102 engages the pin 101, the arm 97 of the bell crank lever 98 is rotated in an anti-clockwise direction and, through the link 95, rotates the crank arm 93 in a clockwise direction to rotate the shaft 78 and swing the frame 76, 77, 80, and the turn table 65 through substantially 90°. After the eccentric has rotated through 180° the strap 104 moves the arm 103 toward the right as viewed in Fig. 6 and the pin 106 engages the arm 107 of the bell crank lever 98 and moves the arm 107 in a clockwise direction to effect the lowering of the frame and table. As said table is moved into horizontal position the arm 107 of the bell crank lever 98 is moved out of the path of the pin 106, and the latter may ride onto the upper surface of the extension 108 but, owing to the length of said extension as heretofore described, said pin 106 can never get beyond the same so as to engage the opposite side of said extension 108 of the arm 107 and interfere with the operation of the device.

*Tablet-discharging mechanism.* (*Figs. 1, 2, 4, 6, and 7*)

In conformity with the present invention, the tablet on the table 65 is automatically discharged therefrom as the table is moved into vertical position to receive a new tablet. While any suitable discharging mechanism may be employed so far as respects certain features of this invention, the preferred construction comprises means for releasing the tablet from the table so that it will move under the influence of gravity into a suitable receptacle for receiving the same. In the form shown, the cabinet 6 is provided with an elongated aperture 110 which extends substantially parallel to the shaft 78 and closely adjacent thereto, said slot being sufficiently long to receive a tablet of the maximum diameter to be employed. Beneath said slot 110 is a receptacle 111 (Fig. 2) into which the tablets may drop, the walls of said receptacle and of the slot 110 being desirably lined with felt or other soft material, as shown at 112, so as to prevent injury to the tablet as it passes through said slot and into the receptacle 111. A deflector plate 110', also covered with felt, may be positioned in the slot 110 to guide the tablets as they enter the receptacle 111.

Means are preferably provided for freeing the tablet on the table 65 from the center post 66 as the table swings upwardly, so that the tablet may be discharged through the slot 110 before the table reaches its vertical or tablet-receiving position. Any suitable means may be provided for effecting this function; in the form shown, a lever 113 is pivotally mounted on a rod 114, which extends between the arms 76 and 77 of the transfer mechanism, by means of depending lugs 115 on said lever. One end of said lever is expanded into arcuate form, as shown at 116, and is designed to underlie a tablet on the table 65, while the opposite end of said lever is in the form of a plate 117. A coil spring 118 is connected to said plate-like end 117 and the shaft 78, and by its tension, tends to hold the lever 113 substantially parallel to the arms 76 and 77. Mounted on the support 5, in the path of movement of the plate-like end 117 as the latter swings with the frame 76, 77, 80, is an upstanding lug 119 provided with a curved free end 120. As the frame 76, 77, 80 swings from a horizontal to a vertical position the plate-like end 117 engages the curved surface 120 of the lug 119, and said lever is rotated about its axis 114 with respect to said frame, and against the tension of the spring 118, to the position shown in Fig. 2. During this movement the arcuate end 116 of said lever, which underlies the tablet on the table, tilts the tablet with respect to said table, and about its far edge, so that the center hole of the tablet is freed from the center post 66 of said table. By this time the table 65 has swung upwardly to such an inclination that the tablet will slide downwardly from the table, and across the arcuate end 116 of said lever, into the slot 110, as clearly illustrated in Fig. 2. As the frame continues to swing upwardly the end 117 will snap past said lug 119 and the spring 118 will return the lever 113 to normal position. During the return of the table and frame to horizontal position the plate-like end 117 of the lever 113 engages the lug 119 and the lever 113 is tilted in the opposite direction against the tension of the spring 118 until it snaps past said lug 119, but this movement has no effect on the tablet on the table because the end 116 of the lever 113 is depressed with respect to the table.

Tone-arm returning mechanism. (Figs. 1, 3, 11, 12, 13 and 21.)

Any suitable sound reproducing instrumentalities may be employed, that illustrated being the conventional taper tone-arm 125 having a tubular end mounted in any suitable support 126 whereby the tone-arm may oscillate across the face of a record tablet. Said tone-arm is preferably so mounted that its axis of oscillation is slightly inclined to the vertical to the end that said arm may have a slight inclination to move inwardly toward the center of the table 65. Tone-arm 125 communicates with any suitable sound amplifying device 127 which may be mounted within the cabinet 6. Rotatably mounted on the free end of said tone-arm 125 is the usual or any suitable goose neck 128 carrying at its free end a sound reproducer 129 of any suitable construction. In conformity with the present invention, means are provided for moving said sound reproducing instrumentalities out of the path of the oscillating table 65 at the completion of the reproduction of sound from a tablet on said table, such movement taking place before the table is swung upwardly to discharge the reproduced record and receive a fresh tablet.

Any suitable means may be provided for moving the tone-arm 125 and the reproducer 129 from their position at the end of a record tablet to a position outside of the periphery of said tablet. In the form shown, the tone-arm 125 is provided with a depending post 130, and mounted for cooperation with said post is a lever 131 pivotally mounted at 132 in any suitable way, as on a depending lug, and having its upper end projecting through a slot in the top wall 5 of the cabinet. The upper end 133 of said lever 131 is bent horizontally, substantially at right angles as shown at 134, and flared to provide an inclined lateral edge 135 for engagement with the depending post 130. Beyond said flared portion, said lever is reduced in width as shown at 136, so as to provide a slot 137 between the extremity of said flared portion and a horizontally extending arm 138 which projects a considerable distance beyond said flared portion and is enlarged at its end as shown at 139 to provide an inclined surface 140. The depending end 141 of said lever 131 is extended laterally to form a toe 142, and said end is also provided with an elongated arcuate slot 143 which is at a small angle to a radius from the axis of oscillation of said lever 131. Received within said slot 143 is a pin or screw 144 projecting from the lateral arm 145 of an eccentric strap 146 which cooperates with an eccentric 147. The opposite end of said eccentric strap carries a plate-like extension 148 which at its upper edge is provided with a curved cam surface 149 designed to cooperate with a fixed pin or roller 150 suitably mounted on the frame of the machine.

During the period when sound is being reproduced, the eccentric 147 is stationary and the pin 144 is adjacent the top of the slot 143, so that it is relatively close to the axis of oscillation of the lever 131. When the eccentric 147 starts to rotate, in an anti-clockwise direction as viewed in Fig. 12, the arm 145 on the eccentric strap 146 rotates the depending arm 141 of the lever 131 in an anti-clockwise direction and the upwardly projecting end 133 of said lever in an anti-clockwise direction. The upper end of said lever thereupon engages its inclined edge 135 with the depending post 130, which has been brought into adjacency thereto by the travel of the reproducer to the end of the record groove, and as said lever 131 swings on its axis 132, the inclined edge 135 wipes across the surface of the depending post 130, exerting a lateral pressure on said post and swinging the tone-arm about its axis of oscillation outwardly until the reproducer is past the edge of the record tablet. The inclined surface 135 is made of sufficient length to move the reproducer outside of the periphery of the largest record tablet to be used in the machine, and during this movement the lever 131 is moved rapidly owing to the radial distance of the pin 144 (at the top of the slot 143) from the axis of oscillation 132 of said lever. When the tone-arm has been moved to such a position that the reproducer is outside of the periphery of the record tablet the inclined edge 135 passes out of contact with the post 130, and said post rides into the slot 137 (see Fig. 13) for a purpose to be hereinafter explained.

Mechanism for elevating and lowering the reproducer. (Figs. 2, 3, and 14 to 21.)

In conformity with the present invention suitable means are provided for elevating the stylus of the sound reproducer out of engagement with the record tablet prior to the outward movement of the tone-arm and sound reproducer and for maintaining said stylus elevated during the period when the tone-arm and sound reproducer are being moved outwardly to free the periphery of the record tablet. Any suitable means, so far as respects certain features of this invention, may be employed to effect this function. In the preferred embodiment, however, a bail 155 is suitably mounted on the goose neck 128 and is engaged and operated by a longitudinally reciprocating rod 156 suitably mounted on the tone-arm 125. In the structure illustrated, an arcuate plate 157 is suitably secured, as by a plurality of screws 158, to the under side of the tone-arm 125 and carries a plurality, for example three, depending lugs 159 which are apertured to afford a bearing for the sliding rod 156. In order to enable adjustments between the rod 156 and the bail 155 a screw 160, shown as threaded into the end of the rod 156 and retained by a lock nut, constitutes an adjustable extension of said rod. Mounted on the rod 156 for movement therewith is an elongated housing 161 secured on said rod in any suitable way as by one or more screws 162. The under side of said housing 161 is provided with a longitudinal channel or slot 163 and pivoted within said slot, as on a pin 164, is a plate-like member 165 which at its opposite end is provided with an overhanging ledge or shoulder 166.

A lever 167, (Fig. 14) shown as formed with a pair of apertured lugs 168, is suitably pivoted on the frame-work of the machine to oscillate on the pivot pin 168' (Fig. 19) and the upwardly extending portion of said lever projects through the top wall of the cabinet and is formed into an arcuate apron 169 which inclines downwardly and rearwardly (see Fig. 21) for a purpose to be hereinafter explained. The upper edge 170 of said apron 169 constitutes a track upon which the overhanging shoulder 166 of the plate-like member 165 normally rides. The depending end 171 of lever 167 is provided in any suitable way with a wedge-shaped cam follower 172. As shown more particularly in Figs. 15 and 20 said cam follower may be formed as a wedge-like projection on a plate 173 secured to the depending plate-like end 171 of said lever.

Mounted for cooperation with said cam follower 172 are a pair of plate-like reciprocating cam members 174 and 175. Member 174 is provided with a lateral longitudinal projection 176 having a cam edge which, as shown more particularly in Fig. 14, includes two notches 178 and 179 between which is a wedge-shaped projection 180 which extends outwardly to approximately the plane of the remainder of the edge of the projection 176 (see Fig. 20). Member 175 has a corresponding lateral longitudinal projection 181 which is cut away at one extremity to provide the inclined cam surface 182. Members 174 and 175 are designed to move in unison through a part of their stroke and, to this end, a screw 183 is threaded into the member 175 and passes through a slot 184 in member 174. A leaf spring 185 is positioned between the head of the screw 183 and the member 174 and normally urges the two members 174 and 175 into frictional contact. Relative movement between said members 174 and 175 is enforced, however, by the engagement of a pin 186 (Fig. 20) with the ends of a lateral slot 187 (Fig. 14) in member 175, whereby further movement of the latter member is stopped, and member 174, owing to the pin and slot connection 183, 184, may move with respect to member 175.

Members 174 and 175 are mounted for reciprocation on the inwardly directed flanges 188 (Fig. 20) of a channel-shaped bracket or housing 189 suitably supported from the frame of the machine, the side of said bracket being provided with a longitudinal slot 190 through which the cam-edged projections 176 and 181 of the members 174 and 175 project into cooperative relation with the cam follower 172. Said cam follower 172 is maintained in operative engagement with said cam edges by a spring 191 extending from a depending arm 192 on the lever 167 to a suitable lug 192' (Fig. 20) on the frame of the machine. For convenience of construction, the arm 192 may be an extension of one of the lugs 168 by which lever 167 is pivotally mounted.

To move cam members 174 and 175, the former of said members is provided with a depending lug 193 (Fig. 14) to which is pivotally attached at 194 a laterally extending arm 195 projecting from an eccentric strap 196 cooperating with an eccentric 197 (see Fig. 19). When eccentric 197 rotates in a clockwise direction (as viewed in Fig. 19), arm 195 is moved to the right and reciprocates cam member 174 in the same direction, and cam member 175 moves with cam member 174, owing to the friction afforded by the leaf spring 185. Cam member 175 being in the position with respect to cam member 174 shown in Fig. 14, the two cam-edged projections 176 and 181 act as a single cam edge, the projection 181 covering the notch 179 and the cam surfaces 180 and 182 being coincident. At the beginning of this movement cam follower 172, which is in notch 178, is moved by the combined action of the cam surfaces 180 and 182 to the right, as viewed in Fig. 14, so that lever 167 is oscillated about its pivot 168' and its upper apron-like portion 169 is oscillated to the left or backward as viewed in said figure. The overhanging shoulder 166 of plate-like member 165 is then riding on the upper surface 170 of said apron, and said apron, as it oscillates, therefore presses forwardly on said member 165 and, through its connection to the rod 156 (see Figs. 3 and 16), engages said rod with the bail 155 to rotate the goose neck about its axis and elevate the stylus of the reproducer out of engagement with the tablet. This occurs before the tone-arm starts on its outward movement, and during all of the time that the tone-arm and reproducer are being moved outwardly beyond the periphery of the tablet, the cam follower 172 is riding on the smooth edges of the combined cam projections 176 and 181 to hold the apron 169 in its forward position to maintain the stylus out of engagement with the tablet by the pressure of said apron on the plate 165 which is transmitted through the rod 156 to the bail 155.

Mechanism for moving the reproducer into starting position. (Figs. 2, 3, and 11 to 21).

In conformity with the present invention means are provided for moving the reproducer into position for cooperation with the beginning of the record trace on the tablet which has been brought into playing position and, in order that records of different diameters, e. g. the standard 10 or 12 inch tablets, may be employed interchangeably or intermixed in any desired order, said means are preferably so constructed as to move the reproducer automatically into position for cooperation with the beginning of the record tablet whether the tablet be of large or small diameter.

While any suitable means may be employed to effect this purpose so far as respects certain features of this invention, this function is effected in the preferred construction (see Figs. 13 and 14) by the plate-like cams 174 and 175 in cooperation with the lever 167 and by the action of the lever 131 on the depending post 130. Mounted within a transverse aperture 205 in the post 130 (see Figs. 16 and 17) is a short plunger or auxiliary member 206 in alignment with the inner end of the rod 156 for actuation thereby. To enable adjustment between said plunger 206 and said rod 156 a screw 207 is threaded into the end of rod 156 and retained in adjusted position by a lock nut, said screw constituting an adjustable extension of the rod 156. Plunger 206 is provided on its under side with a V-shaped notch 209, and the post 130 is provided with a central recess in which is mounted a bevel headed plunger 210 which is normally urged upwardly by a coil spring 211 received between the head of said plunger and the bottom of said recess. The opposite end of plunger 206 projects through the opposite side of post 130 and is provided with a flattened or beveled end 212. End 212 of plunger 206 is in the path of movement of the edge 213 of the arm 138 at the extremity of lever 131, (see Figs. 3 and 13) as well as in the path of movement of the inclined edge 140 adjacent the end of said arm.

Pivoted on the front of the apron 169 at 214' is a track 214 having a horizontal ledge 215. Track 214 has a depending extension 216 in which is an arcuate slot 217 having its center of curvature at 214' (see Fig. 19). Slot 217 receives a pin or screw 218 mounted in the front of the apron, said pin by coaction with said slot limiting the extent to which the track 214 may pivot about its center 214'. Track 214 is also provided with a second depending extension 219 which is bent right angularly as shown at 220 to provide a foot by which the track may be elevated. To effect this latter function a plunger 221 is mounted for vertical reciprocation within an aperture in the wall of the cabinet, and carries at its lower end, and by preference adjustably connected thereto, a slotted head 222 (see Fig. 12) in which is pivoted at 223 an arm 224 which, at its opposite end, is pivoted at 225 on a depending lug or bracket 226 on the frame of the machine. Arm 224 overlies and is operated by the extremity 142 of the lever 181 heretofore described.

When the tone-arm and reproducer have been moved to their outermost position and a new record has been brought into playing position, eccentric 147 has rotated through approximately 180° from the position shown in Fig. 12, and owing to the cam action of the surface 149 on the pin or roller 150, plate extension 148 and eccentric strap 146 connected thereto have been so moved that arm 145 has forced the pin or screw 144 into the lower end of the slot 143, so that the radius of application of force by the arm 145 to the lever 131 is increased and lever 131 is therefore moved at a reduced speed. As arm 145 moves to the left as viewed in Fig. 12 the lower end 141 of lever 131 is moved in a clockwise direction and the upper end 133 of said lever is also moved in a clockwise direction. Therefore the arm 138 is moved to the right as viewed in Figs. 12 and 13 and the inclined surface 140 engages the depending post 130 on the tone-arm 125 to swing said tone-arm in toward the beginning of the record groove of a tablet in playing position.

As heretofore pointed out, as the tone-arm and reproducer are being moved outwardly, the plate-like cam members 174 and 175 are being moved toward the left as viewed in Fig. 14, the cam projection 181 of member 175 overlying the cam projection 176 of member 174 substantially as shown in said figure. Before the termination of this movement toward the left, pin 186 engages the right hand end of slot 187 and stops further movement of member 175, while member 174 continues to move to the left, the latter slipping over the surface of member 175 as permitted by the pin and slot connection 183, 184. This relative movement causes cam projection 176 to move to the left with respect to cam projection 181, so that both notches 178 and 179 and the intermediate elevation 180 are out from under the cam projection 181. After the eccentric 197 has moved through approximately 180° the plate-like cam members 174 and 175 are reciprocated in the opposite direction, i. e. toward the right as viewed in Fig. 14, said plate-like members now moving as a unit owing to the friction therebetween produced by the leaf spring 185, but with the members in their new relative position wherein the notches 178 and 179 are both exposed. The reproducer during all of this time is of course held elevated with respect to the record tablet by the coaction of the cam follower 172 with the plane edges of the combined cam projections 176 and 181.

Just as the reproducer reaches the position where it may engage the beginning of a large record tablet, say a standard 12 inch tablet, the notch 179 comes opposite the cam follower 172 and the latter is drawn into said notch 179 by the spring 191. This oscillates the lever 167 about its axis and causes the apron 169 to be moved to the right as viewed in Fig. 14. This permits the plate-like member 165 to follow said apron, and the reciprocating rod 156 and plate-like member 165 will reciprocate rearwardly under the weight of the reproducer as applied to the forward end of the rod 156 through the bail 155. If there is a 12 inch tablet in playing position, the stylus of the reproducer will promptly engage said tablet and further pressure is thereby taken off of the reciprocating rod 156. The latter, with its plate-like member 165, will therefore cease to move rearwardly, and the apron 169 will move out from under the overhanging shoulder 166 on the member 165, whereby the latter may drop by gravity, pivoting around its axis 164, until it falls onto the pivoted track 214. When the member 165 is supported on the ledge 215 of the track 214 it is uninfluenced by any further oscillation of the apron 169 when the cam follower 172 is moved in the opposite direction by the elevation 180 because of the rearward inclination of said apron heretofore referred to.

If there is no record tablet in position to receive the stylus of the reproducer, however, the weight of the reproducer is exerted through the bail 155 on the reciprocating rod 156 throughout the rearward oscillation of the apron 169, and the plate-like member 165 is therefore retained with its overhanging shoulder 166 on the upper surface 170 of said apron. The reciprocating rod 156 thereby makes its full stroke in the rearward direction and its adjustable extension 207 engages the small plunger 206 to press the latter rearwardly through its aperture 205 in the post 130. This rearward motion of the plunger 206 brings its notch 209 into the path of the beveled end of the plunger 210, and the latter is forced upwardly by its spring 211 to complete the rearward movement of the plunger 206 by the coaction of the beveled end of the plunger with the inclined wall of said notch. The plunger 206 is thus moved into its rearmost position with its end 212 in the path of the inclined surface 140 on the member 138. Therefore the continued movement of the member 138 toward the right as viewed in Figs. 12 and 13 will, by coaction of the inclined surface 140 with said plunger 206, continue to move the tone-arm inwardly the same as it was previously moved inwardly by the coaction of inclined surface 140 with the surface of the post 130. The elevation 180 will operate the cam follower 172 to oscillate the apron 169 forwardly and then, when the reproducer reaches the position suitable for beginning a smaller tablet, say a standard 10 inch tablet, notch 178 comes opposite said cam follower 172 and the apron again is oscillated rearwardly to lower the reproducer. When the stylus of the reproducer engages the record tablet in this position, the pressure of the bail 155 on the reciprocating rod 156 is relieved, said rod and its plate-like member 165 cease their rearward movement, the apron 169 moves out from under the overhanging shoulder 166 of the plate-like member 165, and the latter drops onto the ledge 215 of the pivoted track 214.

Near the end of the movement of the plate-like cam members 174 and 175 the pin 186 engages the opposite end of the slot 187. (the left hand end as viewed in Fig. 14) and further movement of plate-like member 175 to the right as viewed in this figure is stopped. Member 174 continues its movement toward the right, slipping over the surface of member 175, however, until cam projection 176 moves under cam projection 181 to the position wherein the latter overlies the notch 179, i. e. until all the parts are restored to their original condition. The plate-like member 165 is now raised and its overhanging shoulder 166 restored to a position where it can ride onto the upper surface 170 of apron 169, by pivoted track 214, which is elevated to the position shown in Fig. 19 by the coaction of the plunger 221 with the foot 220 on said pivoted track, said plunger being reciprocated upwardly by the engagement of the extension 142 of the lever 131 with the pivoted arm 224 as the tone-arm returning lever 131 reaches its extreme position of oscillation in a clockwise direction as viewed in Fig. 12.

If the small plunger 206 has been moved rearwardly to its extreme position, said plunger is restored to its forward position by the action of the edge 213 of the arm 138 on the rear end of said plunger 206 when the post 130 rides into the slot 137 of lever 131 as heretofore described (see Fig. 13). If a record of large diameter has been previously reproduced, so that the reciprocating rod 156 has not pressed the plunger 206 into its rearmost position, the edge 213 of the arm 138 performs no function and the post 130 rides freely in said slot 137.

Trip mechanism. (Figs. 11, 12, 13, 16 and 17.)

In conformity with the present invention means are provided whereby the heretofore described devices for changing the record tablets and restoring the reproducing instrumentalities to starting position are automatically thrown into operation at the termination of the reproduction of a record tablet. While as respects certain features of this invention any suitable means may be employed to effect this function, the preferred construction employs means actuated by the co-operation of the sound reproducing instrumentalities with the record tablet. To this end each record tablet is preferably provided with means whereby, upon the termination of the reproduction of sound from said record tablet, the sound reproducing instrumentalities are given a small reverse movement. While the record tablets may be provided with any suitable means to accomplish this purpose, the preferred construction employs an eccentrically arranged groove 230 (see Fig. 1) at the central portion of the record tablet and communicating with the end of the usual sound reproducing groove. This eccentrically arranged groove may be conveniently formed as a circular groove described about a point out of coincidence with the center of the record tablet.

In order that the aforesaid small reverse movement of the reproducing instrumentalities may effect a tripping action, the depending post 130 on the tone-arm is provided with one or more pawls 231 pivoted on said post at 232 and prevented from dropping out of operative position by engagement with a pin 233 on said post. Said pawls 231 during the traverse of the sound reproducing instrumentalities across the record tablet overlie and are in light contact with an arcuate serrated bar 234 pivoted at 235 on a depending trip arm 236 which in turn is pivoted at 237 on a depending lug on the frame of the machine. The teeth on said serrated bar incline in the direction of movement of the pawls during sound reproduction, and when the sound reproducing instrumentalities are given the reverse movement by the action of the eccentrically arranged groove 230 on the stylus of the reproducer, the post 130, travelling with the tone-arm 125, moves the pawls 231 outwardly and, by their engagement in the inclined teeth of the serrated bar 234, the pawls thrust said bar to the left as viewed in Fig. 12, and thereby cause the trip arm 236 to move its trip finger 238 in the same direction.

The eccentrics 105, 147 and 197 are preferably mounted on a common sleeve 239 which in turn is mounted on a continuously rotating counter shaft 240 (see Fig. 3). Fixed on the shaft 240 adjacent one end thereof are one or more ratchet wheels 241, (see Fig. 12) two ratchet wheels being preferably employed with their teeth staggered. Mounted on the sleeve 239, or the eccentric 147 carried thereby, is a plate 242 upon which is pivoted at 243 one or more pawls 244. In the form shown, two pawls are employed in position for co-operation with the two ratchet wheels and an auxiliary pawl 245 has a lip 246 which underlies the two pawls 244 and a lip 247 which overlies these two pawls, so that the three pawls are caused to operate as a unit. Lip 247 is adapted to engage the trip finger 238 (see Fig. 11) and constitutes therewith a detent for holding said pawls out of engagement with the ratchets 241. Said pawls 244 are normally urged by suitable leaf springs 248 in the direction to engage their teeth with the ratchet wheels 241, but when during the rotation of the plate 242 the lip 247 engages the trip finger 238, the pawls are moved about their pivotal axis 243 until their teeth are withdrawn from the ratchets 241.

In order that the pawls may be positively snapped out of engagement with the teeth of the ratchets 241 and prevented from clattering over said ratchets, the plate 242 is preferably provided with an extension 249 (see Fig. 12) provided with a pointed or wedge-shaped end 250, and suitably mounted on the frame of the machine is a three-armed lever 251 pivoted at 252. Arm 253 of said lever is provided with a notch 254 adjacent its end and in the path of movement of the pointed end 250 of the extension 249 on plate 242. Arm 255 of said lever is bent angularly as shown and a coil spring 256 is connected to said arm 255 and to a pin 257 on the plate-like extension 148 of the eccentric 147. Arm 258 of said lever is provided with a pin 259 which has a limited movement in a slot 260 in the frame of the machine or a depending lug thereon (see Fig. 11). The pin or roller 150 heretofore referred to may be conveniently mounted on or as an extension of the pivot 252 of the lever 251.

It will be perceived that the coil spring 256 performs the dual function of urging the plate-like extension 148 of eccentric 147 in such a direction as to maintain its cam edge 149 in contact with the pin or roller 150 and to urge the lever 251 into such a position that its arm 253 is in the path of movement of extension 249 on the plate 242.

Just as the lip 247 engages the trip finger 238 so as to move the pawls out of engagement with the ratchet wheels, extension 249 on plate 242 wipes into contact with the arm 253 of lever 251. The lever is slightly rotated in an anti-clockwise direction against the tension of the spring 256 until the pointed end 250 of said extension 249 snaps into the notch 254, whereupon the coil spring 256 rotates the lever 251 slightly in a clockwise direction and positively moves the plate 242 so as to withdraw the teeth of the pawls 244 clear of the ratchet wheels 241.

In order that the serrated bar 234 may be withdrawn from the path of the pawls 231 during the period when the sound reproducing instrumentalities are being moved outwardly, and therefore prevent said pawls from vibrating in passing over the teeth on said bar, said bar 234 is preferably provided with an arm 261 which is integral therewith and extends approximately parallel thereto from the hub by which said bar is pivoted on the pivot pin 235. Pivoted at 262 on the outer extremity of said arm 261 is a depending member 263 which as shown in Fig. 12 is bent at approximately right angles in three directions. Arm 261 is also provided at its free end with an extension 264 which projects at substantially a right angle thereto and the extremity of member 263 is connected to projection 264 by a coil spring 265. Member 263, which constitutes a ledge or shoulder on the arm 261, is normally held by the spring 265 against the projection 264 but may yield with respect to said projection in the manner to be explained.

Lever 131 is provided with a lug or shoulder 266 (Figs. 11 and 12) in position to underlie the member 263 and hold the arm 261, and therefore the serrated bar 234, in their upper or normally operative position, as shown in Fig. 12, during the period when the sound reproducing instrumentalities are traversing a record tablet. When the serrated bar 234 is thrust to the left as viewed in Fig. 12, the arm 261 is also thrust in the same direction, and the member 263 moves off of the lug or shoulder 266 and drops into the undercut portion 267 on the lever 131 (see Fig. 12). Thereby the serrated bar 234 is dropped out of engagement with the pawls 231. As lever 131 makes its oscillating movement the lug or shoulder 266 causes the member 263 to pivot about its axis 262 with respect to arm 261, and against the tension of spring 265, until said lug or shoulder 266 passes beneath said member 263. Then as lever 131 completes its movement, said lug or shoulder 266, moving upwardly, engages the member 263 and restores the arm 261 and the serrated bar 234 into their normally operative position with the serrations of said bar in position for engagement with the pawls 231.

Manual release. (Figs. 11, 12, and 20.)

In order that the automatic mechanism heretofore described may be manually released so as to effect an exchange of records and a restoration of the sound reproducing instrumentalities to starting position without waiting until a tablet has been completely played, as may be desirable in the event that the record in playing position is not liked, manual means are preferably provided for initiating the actuation of the automatic mechanisms heretofore described. In the form shown, a press button or plunger 270 projects through a wall of the cabinet and is normally urged upwardly by a coil spring 271 positioned in the cylindrical recess 272 provided for said plunger. The press button or plunger 270 is provided intermediate its length with an inclined or cam surface 273 and reciprocably mounted in the frame of the machine is a rod 274 having one end bent to constitute a cam follower 275 for cooperation with the beveled surface 273. The opposite end of rod 274 is pivoted to a lever 276 which is pivotally mounted at 277 (see Fig. 20) and has its opposite end 278 adjacent the trip arm 236. When plunger or press button 270 is depressed the inclined surface 273 acting on end 275 of rod 274 presses the latter toward the right as viewed in Fig. 12, and against the tension of a spring 276' (see Fig. 20), and causes the lever 276 to rotate around its axis 277 and its end 278 to engage and move the trip finger 238 to the left as viewed in Fig. 12. This movement is the same as would be effected by the engagement of the pawls 231 with the ratchet bar 234 when the reproducing instrumentalities are moved reversely by the action of the eccentrically arranged groove 230, and the trip finger 238 is accordingly withdrawn from lip 247 and the pawls 244 permitted to engage the ratchet wheels 241 to cause the shaft 240 to rotate the sleeve 239 and the eccentrics thereon.

Motor controlling device. (Figs. 6 and 7.)

Any suitable motor may be employed for driving the shaft 240 and the turn table shaft 84. In the form shown, any suitable electric motor, diagrammatically illustrated at 285, drives the turn table shaft 84 through a worm 286 and worm wheel 287. Mounted on said shaft 84 is a second worm 288 which drives a worm wheel 289 on the shaft 240. Suitable governor mechanism 290 (see Fig. 2) is also driven from the motor and an auxiliary governor 291 may be employed, if desired, to prevent racing of the machine under changes of load.

When an electric motor is employed, resistance is preferably interposed in the motor circuit and, as the work of lifting the table 65 to discharge a record tablet and position said table to receive a new record is considerably in excess of that necessary to rotate the table and tablet during the reproduction of sound from the latter, it is desirable to cut out some of this resistance so as to increase the effective power of the motor during the period when the table 65 is being moved from a substantially horizontal to a substantially vertical position. Any suitable means may be employed to effect this function, that illustrated comprising any suitable switch 292, preferably of the pull chain type so that successive movements in the same direction alternately close and open the switch. In the form shown, the switch 292 is provided with a scythe-shaped arm 293 and the eccentric 105 is provided on one of its faces with a plate 294 flanked to provide a pair of arms 295 which are bent at their outer ends as shown at 296. During each revolution of the eccentric 105 the switch arm 293 is operated twice by the bent ends of the two flanged arms 295. When the sleeve 239 is stationary the parts are in substantially the position shown in Fig. 7; as soon as the sleeve 239 begins to rotate with the shaft 240, part 296 of the lower flanged arm 295 operates switch arm 293 to cut out some of the resistance; during the time that the table is being elevated to discharge a record tablet thereon and move into the position to receive a fresh tablet, part 296 of the upper flanged arm 295 in Fig. 7 is moving into position to again actuate the switch arm 293; when a fresh tablet has been received on the table, switch arm 293 is actuated by part 296 of the last-named flanged arm 295 and the normal amount of resistance is again cut into the motor circuit. As gravity aids the lowering of the tablet and the table into playing position, additional motive power during this period of operation of the tablet-transfer device is unnecessary.

Automatic brake mechanism. (Figs. 6, 7, 8 and 22.)

In conformity with the present invention means are preferably provided whereby the machine will be automatically stopped in the event that the tablet-transfer device fails to bring a tablet into playing position. While as respects certain features of this invention any suitable means may be employed to effect this function the preferred construction comprises means on the tablet-transfer device which are adapted to actuate the stop mechanism but which are rendered inoperative to effect this function by the engagement of a record tablet therewith.

In the form shown, an arm 300 is pivoted on one of the arms of the tablet-transfer device, e. g. arm 76, at 301 and has one extremity bent upwardly as shown at 302 so as to normally lie in a position where it is engaged by a tablet on the table 65. Pivoted to arm 300 at 303 is a depending arm 304 provided with a laterally projecting pin 305 which works in an L-shaped slot 306 (see Fig. 7) in a depending lug on the arm 76. Owing to the disposition of the weight of the parts lever 300 tends to hold arm 304 with its pin 305 in the horizontal leg of the L-shaped slot 306. If there is a record tablet on the table 65, however, said tablet engages the upstanding end 302 of arm 300 and tilts said lever about its axis 301 so as to draw pin 305 into the vertical leg of the L-shaped slot 306, in which position pin 305 is rendered inoperative to actuate the stop mechanism. If no tablet is being carried down by the table 65, on the other hand, pin 305 remains in the horizontal leg of said slot, and operates the stop mechanism through the means now to be described.

Pivoted on an upstanding lug 307 (see Fig. 8) of a plate 308 suitably secured to the wall of the cabinet is a lever member 309 having its axis at 310. Extending eccentrically through said member 309 is a pin 311 which at one side pivotally receives the end of a sliding rod 312 mounted to reciprocate in an apertured post 313. At its other side pin 311 is connected by a coil spring 314 to a post 315. Member 309 has a laterally projecting arm or shoulder 316, the upper surface of which is in the path of movement of the pin 305 when the latter is in the horizontal leg of the L-shaped slot. Member 309 is normally held in the position shown in Fig. 8 by the coil spring 314, but if pin 305 engages the arm 316 of said member 309, the latter is turned about its axis 310 and thrusts the rod 312 to the right as shown in Fig. 8.

It is desirable that the lug 302 be withdrawn from the surface of the record tablet when the latter is in playing position, so that said lug will not drag on the surface of the tablet. This may be effected by providing the lever 300 with a depending lug 300' which engages a fixed abutment when the table reaches playing position and tilts the lever 300 slightly so as to withdraw lug 302 from engagement with the tablet.

The opposite end of rod 312 is disposed opposite the arm 317 of a bell crank lever 318 pivoted on the stop plate 319 at 320. The other arm 321 of said bell crank lever 318 is adapted to actuate suitable brake or switch mechanism to effect the stopping of the machine when rod 312 is pressed against arm 317 of said bell crank lever. Any suitable brake or switch mechanism may be employed. In the form illustrated, a plate 322 is pivoted at 323 (see Fig. 22) on the stop plate 319 and has a pair of upstanding lugs 324 and 325. Pivoted on said plate 322 at 326 is a switch lever 327 which is extended at one end to form the hand grasp 328 and at its opposite end is curved to provide the two arms 329 and 330. A coil spring 331 is connected to an upstanding lug 332 on arm 321 and to an upstanding lug 333 on switch lever 327. Pivoted on the switch lever 327 at 334 is a member 335 carrying a pawl-like element 336 pivoted on said member at 337. Coil spring 338 connects an upstanding lug 339 on element 336 with an upstanding lug 340 on switch lever 327. An arm 341 projecting from switch lever 327 coacts with a lug 342 on plate 319 for limiting the movement of the switch lever in one direction while a second lug 343 on said plate 319 constitutes a limit for the movement of the switch lever 327 in the opposite direction. The pivot of switch lever 327 is so arranged with respect to the line of pull of coil spring 331 that when the switch lever is moved from the position shown in Fig. 6 to its opposite position in contact with the lug 343, moving plate 322 around its axis 323, the line of pull of coil spring 331 passes slightly across the pivotal axis 326 and the pull of said spring tends to hold the parts in their new position. In this position the extremity of arm 321 frictionally engages the extremity of arm 329. When arm 317 of bell crank lever 318 is moved in an anti-clockwise direction, as viewed in Fig. 6, under the thrust of rod 312, the extremity of arm 321 is disengaged from the extremity of arm 329 and the line of pull of the spring 331 crosses the axis 326 of switch lever 327, so that the latter is pulled by the spring 331 into its off position as shown in Fig. 6.

The usual timing mechanism is illustrated at 344 for cooperation with the members 335 and 336 in a manner understood in the art, said timing mechanism being driven in any suitable way as by worm gearing 345 driven from shaft 84 as shown in Fig. 6. The lever 327 may thereby be operated to stop the machine at a predetermined time by actuation thereof from the mechanism 344 through members 335 and 336.

Clutch mechanism. (Figs. 2, 3, 23, 24 and 25.)

It is desirable that means be provided whereby the automatic features heretofore described may be thrown out of operation if desired so that the machine may be used to reproduce only individual tablets. To this end, the worm wheel 289 is preferably mounted loosely on the shaft 240 and any suitable clutch mechanism is mounted on said shaft to drive said shaft from said worm wheel. In the form shown, a ball clutch 350 is shown as interposed between the worm wheel 289 and a clutch sleeve 351 normally urged into clutching position by a coil spring 352 interposed between said sleeve and a flange 353 mounted on said shaft. To shift the clutch into and out of operation, a clutch lever 354 pivoted at 355 has a yoke 356 engaged in the groove 357 of clutch sleeve 351, and at its opposite end extends into position for engagement with a lateral arm 358 on a stub shaft 359 rotatably mounted in the frame of the machine. Stub shaft 359 may be operated in any suitable way, as by an arm 360 positioned above a plate 361 on the top wall of the cabinet as shown, said plate having lugs 362 to limit the movement of said arm.

In place of the manual clutch illustrated, however, an overload clutch may be employed if desired so that the clutch will move out of engagement with the worm wheel 289 against the tension of its spring 352 in case an excessive load is imposed on the operation of the automatic mechanism.

Support for the reproducer in inoperative position. (Figs. 2, 3 and 16.)

The reproducer 129 as heretofore explained is preferably mounted on a goose neck 128 in any suitable way, as by the interposition of an auxiliary spring sleeve or extension 370 provided with spring arms 371 for clamping the same on the end of the goose neck 128 and provided with the usual bayonet slot 372 for receiving the usual pin on the neck of the reproducer. Such a goose neck extension enables the reproducer to be adjusted into the desired relation to its associated parts. The reproducer may be oscillated on the pivotal axis of the goose neck into an inoperative position with the stylus bar pointed upwardly to facilitate exchange of styli, and it is desirable that the reproducer shall retain its pressure on sliding rod 156 and plate-like member 165 when in this latter position, so as to keep the overhanging shoulder 166 on said member 165 in engagement with the upper surface 170 of the apron 169. To this end, a lever 373 is preferably pivoted on a depending lug 374 projecting from the plate 157, and its upper end is provided with a horizontally extending arm 375 in the path of movement of the reproducer as the latter is swung into inoperative position. The opposite end 376 of said lever is provided with a slot 377 which engages a pin 378 projecting laterally from the housing 161 secured to the sliding rod 156. When the reproducer is tipped back into inoperative position it will engage the horizontally extending arm 375 of the lever 373 and tend to rotate the same in a clockwise direction as viewed in Fig. 16, whereby its arm 376 will press on the pin 378 to thrust the rod 156 rearwardly the same as when the bail 155 engages the forward end of said rod 156.

*Operation.*

A brief description will now be given in summary of the operation of the various devices and mechanisms heretofore described.

To charge the magazine with record tablets, pressure is applied to the plate 19 to thrust the sleeve 16 into the sleeve 12 as far as it will go. As sleeve 16 enters the bore 15 of the sleeve 12 its inner end engages the inclined surface 53 of the head 51 of the plunger 50 and depresses said plunger against the tension of its spring 54 until the slot 48 is brought into alignment with said head 51. Thereupon the plunger 50 is pressed upwardly by its spring 54 and the head 51 enters the slot 48 to lock the sleeve 16 and disk 19 in retracted position. Coil spring 25 now presses the sleeve 16 forwardly until the left hand extremity of the slot 48 engages the left hand side of the head 51, as viewed in Fig. 4. In this position the reduced forward end of the post 21 projects forwardly of the plate 19 so that the desired number of tablets, which may be either or both 10 and 12 inch tablets and arranged in any desired order, may be slipped over the projecting end of said post. Pressure is then applied to the face of the foremost tablet to press the disk 19 and sleeve 16 rearwardly a sufficient distance to withdraw the left hand edge of slot 48 from under the overhanging lip 52 on head 51, whereupon the lever 56 may be depressed to depress the plunger 50 and withdraw its head 51 through the slot 48. Coil spring 25 now presses the disk 19 and series of tablets forwardly until the foremost tablet engages the shoulder 42 on the head 41 of the small plunger 39 (see Fig. 9). As the hand is in engagement with the foremost tablet when the parts are pressed rearwardly, all danger of the disk 19 and the tablets on the post 21 being thrown forwardly with such force by the spring 25 as to injure the tablets is avoided. The magazine is now in position to supply the tablets in succession to the tablet-transfer device as it moves into position to receive successive tablets.

Assume that there is a tablet on the table 65 and that the reproducer 129 has its stylus in engagement with the groove of said tablet and that switch lever 327 is in "on" position so that motor 285 is rotating the turn table shaft 84 and sub-table 85 to drive the turn table 65 owing to the cooperation of the lug 89 on the latter with one of the lugs 88 on the former. As the tablet rotates the reproducer is fed from the beginning to the end of its sound reproducing groove in the manner well understood in the art.

When the reproducer reaches the end of the sound reproducing groove it immediately enters the eccentrically arranged groove 230 and the reproducer, and thereby the tone-arm, is given a slight reverse movement by the coaction of said eccentrically arranged groove with the stylus of said reproducer. When the tone-arm is given this reverse movement the pawls 231 on the post 130 engage the serrated bar 234 and thrust the latter to the left as viewed in Fig. 12. This movement of serrated bar 234 causes trip arm 236 to swing in a clockwise direction about its pivot 237 and its trip arm 238 to swing out of engagement with the lip 247 of the pawls 244, 245, (see Fig. 11) thereby releasing the detent constituted by these parts. These pawls under the action of their springs 248, are depressed so that the tooth opposite the interdental space of one of the ratchet wheels 241 enters the latter and the pawls are thereby locked to the ratchet wheels. As the pawls 244 are mounted on the plate 242, which in turn is mounted on the sleeve 239, whereas the ratchets are mounted on the continuously rotating shaft 240 driven from the turn table shaft 84 through the worm 288 and worm wheel 289, the sleeve 239 immediately begins to rotate and to rotate the eccentrics 105, 147, 197. The arm 145 on eccentric strap 146 immediately begins to rotate the lever 131 in an anti-clockwise direction (Fig. 12) and as its point of engagement with said lever 131 is relatively close to its axis, i. e. in the top of the slot 143, the first movement of said lever 131 is relatively rapid. Eccentric 197 also immediately starts to reciprocate the plate-like cam members 174 and 175 (see Figs. 14, 19 and 20), and as the inclines 180 and 182 of the cam projections 176 and 181 are in position to act immediately on the cam follower 172, lever 167 is immediately oscillated to thrust the apron 169 forwardly. As the plate-like member 165 has its overhang 166 resting on the upper surface 170 of said apron 169, said plate-like member 165 is thrust forwardly and carries with it the reciprocating rod 156 to press on the bail 155 and elevate the reproducer so as to withdraw its stylus from engagement with the record tablet. By this time, lever 131 has engaged its inclined surface 135 with the post 130 and the tone-arm is rapidly moved outwardly beyond the periphery of the record tablet.

By this time the lower arm 295 (Fig. 7) has actuated arm 293 of switch 292 to cut out some of the resistance in the motor circuit and eccentric 105 has moved arm 103 to the left as viewed in Fig. 6 so as to engage the right hand end of its slot 102 with the pin 101 on the bell crank lever 98. The latter is thereby rotated in an anti-clockwise direction as viewed in Fig. 6, and through link 95 rotates crank 93 to rotate shaft 78. The arms 76 and 77 are therefore swung upwardly, and through the engagement of the arcuate flange 80 (Fig. 4) in the groove 73 of the turn table 65, elevate the latter. As the table 65 swings upwardly, the plate-like end 117 of lever 113 engages cam surface 120 on lug 119 to tilt lever 113 about its axis 114 and tilt the record tablet so as to free the latter from the center post 66 of the table (see Fig. 2). In this latter position the tablet is free to be acted upon by gravity and it slides off of the lever 113 through the slot 110 into the receptacle 111. Arms 76 and 77 continue to swing upwardly and carry the table 65 therewith until the latter is brought into alignment with the tablets in the magazine. In his position (see Fig. 10) the turn table post 66 is centered with respect to the head 41 of the plunger 39 by the engagement of the flared portion 67 on the turn table post with the beveled head 41. Simultaneously the tapered end 69 of pin 68 enters the aperture 43 and pivots the lever 28 against the tension of the spring 35 (Figs. 4 and 5) so that the toe 29 on the end of said lever engages the foremost tablet and lifts its center aperture into registry with the head 41 (see Fig. 10). Spring 25 presses disk 19 and the series of tablets forwardly so that the foremost tablet passes onto the center post 66, while the next tablet is caught and retained in forward position by the shoulder 42 on head 41. By this time switch arm 293 (Fig. 7) has been operated by the other flanged arm 295 to cut the normal resistance into the motor circuit, and eccentric 105 has rotated to a position to move arm 103 toward the right as viewed in Fig. 6. Pin 106 then engages arm 107 of bell crank lever 98 and moves the latter lever in a clockwise direction, and through link 95 and crank arm 93 the shaft 78 is rotated to swing the arms 76, 77, downwardly so that the table 65 and the record tablet thereon are brought into playing position (Fig. 1). As the table reaches the latter position its lug 89 engages one of the lugs 88 on the sub-table 85 and the tablet and table begin to rotate.

While the tablet is being changed lever 131 continues to move in an anti-clockwise direction as viewed in Fig. 12 and post 130 is riding in the slot 137 of said lever (see Fig. 13). If the small plunger 206 has been previously thrust into its rearward position, the edge 213 of arm 138 causes said plunger to be forced into its forward position.

When the tablet has reached playing position, eccentric 147 is rotating in a direction to move arm 145 to the right and lever 131 is being rotated in a clockwise direction as viewed in Fig. 12. Inclined surface 140 on arm 138 now engages post 130 to move the tone-arm in towards the starting position for a 12 inch tablet. When the latter position is reached cam follower 172 drops into notch 179 (see Figs. 14 and 20) on plate-like member 174 which, together with plate-like member 175, has been returned nearly to original position by the action of eccentric 197. If a 12 inch tablet is in position to receive the stylus of the reproducer the oscillation of lever 167, as cam follower 172 drops into notch 179, causes the stylus to engage the tablet and, as the pressure of the bail 155 is thereby relieved from the rod 156, the apron 169 moves out from under the plate-like member 165 and the latter drops onto the pivoted track 214. If a 10 inch tablet has been brought into playing position, however, there is nothing to relieve the weight of the reproducer during this oscillation of the lever 167, and the bail 155 presses the rod 156 rearwardly to keep the plate-like member 165 on the apron 169 and to press the small plunger 206 (see Figs. 16 and 17) into its rearward position, to which position it will be carried by the action of the spring-pressed, wedge-shaped head 210 on the V-shaped notch 209 in said plunger 206. The continued movement of the lever 131 in a clockwise direction now causes the inclined surface 140 on arm 138 (see Fig. 13) to engage the projecting end of the plunger 206 and move the tone-arm inwardly to the starting position for a 10 inch tablet. When the latter position is reached the cam follower 172 drops into the notch 178 in the plate-like cam member 174 (see Figs. 14 and 20), and the lever 167 is again oscillated to lower the stylus into engagement with the tablet. When the reproducer engages the tablet, the bail 155 ceases to press the rod 156 in a rearward direction, and the apron 169 oscillates from under the plate-like member 165, which drops onto the pivoted track 214.

If the stylus does not engage the record groove when lowered onto a tablet in either of these positions, the slight inclination given to the axis of oscillation of the tone-arm, with the consequent tendency of said arm to move inwardly, causes the stylus to move inwardly until it engages the record groove.

The lever 131 now swings in a clockwise direction to its extreme position and its toe 142 engages the pivoted arm 224 (see Fig. 19) to press the plunger 221 upwardly and thereby lift the pivoted track 214 to restore the overhanging shoulder 166 on the plate-like member 165 into engagement with the top surface 170 of the apron 169 (see Fig. 14), said apron being held by the co-action of notch 178 with cam follower 172 in a position to retain said shoulder 166 in engagement therewith when the latter has been elevated by the track 214. At the same time the shoulder 266 on lever 131 (see Figs. 11 and 12) engages member 263, which had dropped into the undercut portion 267 when the arm 261 was thrust to the left with serrated bar 234, and lifts said member 263, the arm 261 and the serrated bar 234 into the position for the latter to cooperate with the pawls 231 (see Fig. 14) on the post 130. At the same time the lip 247 on the pawls 244, 245 engages the trip finger 238 (see Fig. 11) and said pawls are rotated out of engagement with the ratchet wheels 241, the pointed end 250 of the extension 249 on the plate 242 simultaneously snapping into the notch 254 in lever 251 so as to positively disengage the teeth of said pawls from said ratchets. The parts are thus restored to original position ready for release of the detent formed by parts 238 and 247 when the stylus of the reproducer next engages the eccentrically arranged groove at the inner end of the tablet being played.

In the event that the record being reproduced is unsatisfactory, the automatic mechanism may be thrown into operation without waiting for the end of the reproduction by pressing on the plunger 270 which through the inclined surface 273 thrusts the rod 274 to the right as viewed in Fig. 12, and thereby moves the lever 276 on its pivot 277 (Fig. 20) to cause its end 278 to engage and trip the finger 238 (Fig. 11) from engagement with lip 247, and thereby start the operation of the automatic mechanisms in the manner heretofore described.

When the tablets in the magazine are exhausted the table 65 comes down into playing position without any tablet thereon. In the absence of the tablet, the end 302 of the lever 300 (see Figs. 7 and 8) is not pressed into position to cause its pin 305 to ride into the vertical leg of the L-shaped slot, but remains in the horizontal leg of said slot and therefore engages the arm 316 on the lever 309 to thrust the rod 312 forwardly, to the left as viewed in Fig. 6, and thereby move the arm 317 of bell crank lever 318 to release the switch lever 327, which moves to "off" position.

If it is desired to use the machine without the automatic mechanism, arm 360 (Fig. 24) may be swung to rotate shaft 359 which, through arm 358, rotates the clutch actuating lever 354 to disengage the clutch from the worm wheel 289. Shaft 240 is then no longer rotated by the motor, and the machine may be used without any of the automatic features.

It will therefore be perceived that a sound reproducing machine has been provided with means for automatically returning the sound reproducing instrumentalities to the starting positions for tablets of different diameters which is not actuated by the movement of a tablet into playing position, and is therefore available for use in machines which make no provision for automatically changing the record tablets, and which does not necessitate the use of a sound box carriage and a feed mechanism therefor thrown out of operation by the engagement of an element with the periphery of the tablet, but which is simple and compact in construction, efficient in operation and positive in action. Moreover, means for automatically returning sound reproducing instrumentalities to the starting positions for tablets of different diameters have been provided which is adapted to co-operate with means for automatically moving a plurality of tablets of different diameters and arranged in any desired order into cooperative relation with said instrumentalities; and also means of this character have been provided which are adapted to be set into operation by a reverse movement given to said instrumentalities by their cooperation with the record tablet. Means have also been provided for manually initiating the operation of the mechanism for changing the tablets and returning the sound reproducing instrumentalities to starting position; and also for entirely cutting out the automatic mechanisms if it is desired to use the machine as a non-automatic machine.

While the embodiment of the invention illustrated on the drawings has been described with considerable particularity, it is to be expressly understood that the invention is not restricted thereto. While the preferred embodiment employs the various features of this invention heretofore described, various features of the invention may be employed without other features thereof; for example, various other mechanisms for changing the record tablets may be employed in connection with the mechanism heretofore described for automatically returning the sound reproducing instrumentalities to the starting positions for tablets of different diameters, or said mechanism for changing the tablets may be entirely omitted; various other means for initiating the operation of said automatic means for returning the instrumentalities to starting position may also be used; and either or both of the means for manually actuating the automatic mechanisms or for cutting out the automatic mechanisms may be omitted or may be employed in machines of other construction.

Changes may also be made in the details of construction, proportion, and arrangement of parts without departing from the spirit of this invention: thus, while eccentrics have been shown and described for operating various devices, cams may be employed instead, if desired; while the record tablets have been referred to as provided with grooves, it is to be understood that this term is intended to embrace a record trace which is elevated with respect to the surface of the tablet as well as one which is depressed with respect to the surface of the tablet; while the sound reproducing instrumentalities have been shown as of the type designed to reproduce sound from a laterally undulating trace, other types of sound reproducing devices may be employed; while the reproducer has been shown as preferably mounted on a goose neck pivoted on a tone-arm which oscillates about a single axis, other forms of tone-arm and reproducer mountings may be employed by suitably varying certain elements of the structure heretofore described; again, while the mechanism for returning the sound reproducing instrumentalities to starting position has been described as designed for co-operation with standard 10 and 12 inch tablets, the invention is applicable to other sizes of tablets and by suitable modification may be employed to reproduce sound from more than two sizes of tablets.

Various other mechanical expressions embodying the present invention or one or more of the several features thereof will now readily suggest themselves to those skilled in the art as a result of the disclosure heretofore made, and it is therefore to be expressly understood that reference is to be made to the appended claims for a definition of the limits of this invention.

Novel features and combinations described and illustrated but not claimed herein are claimed in the joint application of myself and William D. La Rue, Serial No. 706494, filed April 14, 1924.

What is claimed is:—

1. In a sound reproducing machine, the combination of sound reproducing instrumentalities, a support for a record tablet in cooperative relation with said instrumentalities, means for disengaging said instrumentalities from the tablet and returning the same to starting position, and means controlled by the movement of said instrumentalities at an angle to the direction of said returning movement for automatically effecting the engagement of said instrumentalities with the beginning of records on tablets of different diameters.

2. In a sound reproducing machine, the combination of sound reproducing instrumentalities, a support for a record tablet in cooperative relation with said instrumentalities, means for elevating said instrumentalities from the record and returning the same to starting position, and means controlled by weight of said instrumentalities for determining the extent of movement of the same whereby said intrumentalities are automatically postioned for engagement with the beginning of records on tablets of different diameters.

3. In a sound reproducing machine, the combination of sound reproducing instrumentalities, a support for a record tablet in cooperative relation with said instrumentalities, means for disengaging said instrumentalities from the tablet and moving the same outwardly, means for moving said instrumentalities inwardly, and means controlled by movement of said instrumentalities toward the plane of the tablet for determining the extent of said inward movement.

4. In a sound reproducing machine, the combination of sound reproducing instrumentalities, a support for a record tablet in cooperative relation with said instrumentalities, means for disengaging said instrumentalities from the tablet and moving the same outwardly, means for moving said instrumentalities inwardly, and means controlled by the weight of said instrumentalities for effecting a further inward movement of the same.

5. In a sound reproducing machine, the combination of sound reproducing instrumentalities, a support for a record tablet in cooperative relation with said instrumentalities, means for disengaging said instrumentalities from the tablet and moving the same outwardly, means for moving said instrumentalities inwardly, and means whereby said instrumentalities move toward the plane of the tablet at predetermined positions corresponding to the beginning of records on tablets of different diameters.

6. In a sound reproducing machine, the combination of sound reproducing instrumentalities, a support for a record tablet in cooperative relation wtih said instrumentalities, means for disengaging said. intrumentalities from the tablet and moving the same outwardly, means for moving said instrumentalities inwardly, means whereby said instrumentalities move toward the plane of the tablet at predetermined positions corresponding to the beginning of records on tablets of different diameters, and means operated by said instrumentalities for controlling the extent of said inward movement.

7. In a sound reproducing machine, the combination of sound reproducing instrumentalities, a support for a record tablet in cooperative relation wtih said instrumentalities, means for disengaging said instrumentalities from the tablet and moving the same outwardly, means for moving said instrumentalities inwardly, means whereby said instrumentalities move toward the plane of the tablet at predetermined positions during said inward movement, and means whereby said inward movement is continued if said instrumentalities fail to engage a tablet.

8. In a sound reproducing machine, the combination of sound reproducing instrumentalities, a support for a record tablet in coóperative relation with said instrumentalities, means for disengaging said instrumentalities from the tablet and moving the same outwardly, means for moving said instrumentalities inwardly, means whereby said instrumentalities move toward the plane of the tablet at predetermined positions during said inward movement, and means whereby the action of said last-named means is discontinued upon engagement of said instrumentalities with a tablet.

9. In a sound reproducing machine, the combination of sound reproducing instrumentalities, a support for a record tablet in cooperative relation with said instrumentalities, means for disengaging said instrumentalities from the tablet and moving the same outwardly, means for moving said instrumentalities inwardly, means whereby said instrumentalities move toward the plane of the tablet at predetermined positions during said inward movement, and means controlled by the last-named movement of said instrumentalities for determining the extent of said inward movement.

10. In a sound reproducing machine, the combination of sound reproducing instrumentalities, a support for a record tablet in cooperative relation with said instrumentalities, means for disengaging said instrumentalities from the table and moving the same outwardly, means for moving said instrumentalities inwardly, means whereby said instrumentalities move toward the plane of the tablet at predetermined positions during said inward movement, means for predetermining the extent of said inward movement controlled by the movement of said instrumentalities toward tablet-engaging position, and means for discontinuing the operation of said means for moving said instrumentalities toward tablet-engaging position upon engagement of the same with a tablet.

11. In a sound reproducing machine, the combination of sound reproducing instrumentalities, means for supporting a record tablet in cooperative relation with said instrumentalities, means for moving said instrumentalities from the end of the record outside of the periphery of the tablet, and means for moving said instrumentalities into starting position with respect to a tablet on said first-named means, said last-named means being operable to position said instrumentalities automatically at the beginning of records on tablets of different diameters and being controlled by the tendency of said instrumentalities to move toward the plane of the record tablet.

12. In a sound reproducing machine, the combination of sound reproducing instrumentalities, means for supporting a record tablet in cooperative relation with said instrumentalities, means for disengaging said instrumentalities from said tablet at the end of the record thereon, and means controlled by the pressure of said instrumentalities thereon for automatically returning said instrumentalities to the starting positions for tablets of different diameters.

13. In a sound reproducing machine, the combination of sound reproducing instrumentalities, means for supporting a record tablet in cooperative relation with said instrumentalities, means for elevating said instrumentalities from said tablet at the end of the record thereon, means for moving said instrumentalities from the end of the record to the starting positions for tablets of different diameters, and means actuated by the weight of said instrumentalities for automatically controlling the operation of said last-named means.

14. In a sound reproducing machine, the combination of sound reproducing instrumentalities, a support for a record tablet in cooperative relation with said instrumentalities, means for raising said instrumentalities and moving the same to starting position, means whereby said instrumentalities are lowered at the starting position of a tablet of predetermined diameter, and means whereby said instrumentalities are moved to a different starting position upon the failure of said instrumentalities to engage a tablet during said lowering operation.

15. In a sound reproducing machine, the combination of sound reproducing instrumentalities, a support for a record tablet in cooperative relation with said instrumentalities, means for raising said instrumentalities, means for moving said instrumentalities to starting position, means whereby said raising means operates to lower said instrumentalities at the starting position for a tablet of predetermined diameter, and means whereby said moving means continues to move said instrumentalities to a different starting position upon failure of said instrumentalities to engage a tablet during said lowering operation.

16. In a sound reproducing machine, the combination of sound reproducing instrumentalities, a support for a record tablet in cooperative relation with said instrumentalities, means for returning said instrumentalities from the end of the record to the starting position for tablets of a predetermined diameter, and means controlled by the tendency of said instrumentalities to move toward the tablet for moving the same to the starting position for tablets of a different diameter if said instrumentalities fail to engage a tablet in said first position.

17. In a sound reproducing machine, the combination of sound reproducing instrumentalities, a support for a record tablet in cooperative relation with said instrumentalities, means for raising and lowering said instrumentalities with respect to said tablet, means for returning said instrumentalities to the starting position for tablets of a predetermined diameter, and means controlled by the weight of said instrumentalities, in the absence of a tablet to receive the same, whereby said last-named means moves said instrumentalities to the starting position for tablets of a different diameter.

18. In a sound reproducing machine, the combination of sound reproducing instrumentalities, means for supporting a record tablet in cooperative relation with said instrumentalities, means for returning said instrumentalities to the starting playing position for tablets of a predetermined diameter, and means controlled by the failure of said instrumentalities to engage a tablet in said position for moving said instrumentalities to the starting position for tablets of a different diameter.

19. In a sound reproducing machine, the combination of sound reproducing instrumentalities, means for supporting a record tablet in cooperative relation with said instrumentalities, means for returning said instrumentalities to the starting playing position for tablets of a predetermined diameter, and means controlled by the failure of said instrumentalities to engage a tablet in said position for continuing the operation of said returning means to move said instrumentalities into the starting position for tablets of a different diameter.

20. In a sound reproducing machine, the combination of sound reproducing instrumentalities, a support for a record tablet in cooperative relation with said instrumentalities, means for disengaging said instrumentalities from the tablet and returning the same to the starting position for tablets of a predetermined diameter, means for moving said instrumentalities into tablet-engaging position, and means for moving said instrumentalities to the starting position for tablets of a different diameter upon failure of said instrumentalities to engage a tablet in said first position.

21. In a sound reproducing machine, the combination of sound reproducing instrumentalities, a support for a record tablet in cooperative relation with said instrumentalities, means for disengaging said instrumentalities from the tablet and returning the same to the starting position for tablets of a predetermined diameter, means for moving said instrumentalities into tablet-engaging position, and means controlled by the movement of said instrumentalities toward tablet-engaging position for moving said instrumentalities to the starting position for tablets of a different diameter upon failure of said instrumentalities to engage a tablet in said first position.

22. In a sound reproducing machine, the combination of sound reproducing instrumentalities, a support for a record tablet in cooperative relation with said instrumentalities, means for disengaging said instrumentalities from the tablet and returning the same to the starting position for tablets of a predetermined diameter, means for moving said instrumentalities into tablet-engaging position, and means cooperating with said returning means whereby the latter moves said instrumentalities to the starting position for tablets of a different diameter upon failure of said instrumentalities to engage a tablet in said first position.

23. In a sound reproducing machine, the combination of sound reproducing instrumentalities, a support for a record tablet in cooperative relation with said instrumentalities, means for disengaging said instrumentalities from the tablet and returning the same to the starting position for tablets of a predetermined diameter, means for moving said instrumentalities into tablet-engaging position, and means actuated by the weight of said instrumentalities upon their failure to engage a tablet whereby said returning means moves said instrumentalities to the starting position for tablets of a different diameter.

24. In a sound reproducing machine, the combination with sound reproducing instrumentalities, a support for a record tablet in cooperative relation with said instrumentalities, means for raising said instrumentalities from engagement with the tablet and returning the same to the starting position for tablets of a predetermined diameter, means for lowering said instrumentalities at said starting position, and means whereby said returning means moves said instrumentalities to the starting position for tablets of a different diameter upon failure of said instrumentalities to engage a tablet during said lowering movement.

25. In a sound reproducing machine, the combination of sound reproducing instrumentalities, a support for a record tablet in cooperative relation with said instrumentalities, means for moving said instrumentalities outwardly and then inwardly to the starting playing position for tablets of large diameter, and auxiliary means controlled by the failure of said instrumentalities to engage a tablet in said position whereby said last-named means continues to move said instrumentalities inwardly to the starting position for tablets of smaller diameter.

26. In a sound reproducing machine, the combination of sound reproducing instrumentalities, a support for a record tablet in cooperative relation with said instrumentalities, means for returning said instrumentalities to the starting playing position for tablets of a predetermined diameter, and auxiliary means controlled by the failure of said instrumentalities to engage a tablet in said position whereby said returning means moves said instrumentalities to the starting position for tablets of a different diameter.

27. In a sound reproducing machine, in combination with sound reproducing instrumentalities, a support for a record tablet in cooperative relation with said instrumentalities, means for disengaging said instrumentalities from the tablet and moving the same into the starting position for tablets of a predetermined diameter, and auxiliary means controlled by the movement of said instrumentalities toward the plane of the tablet for continuing said movement to the starting position for tablets of a different diameter upon failure of said instrumentalities to engage a tablet in said first position.

28. In a sound reproducing machine, the combination of sound reproducing instrumentalities, a support for a record tablet in cooperative relation with said instrumentalities, means for raising said instrumentalities with respect to said tablet and returning the same to the starting position for tablets of a predetermined diameter, means for lowering said instrumentalities to said starting position, and auxiliary means actuated by the weight of said instrumentalities upon their failure to engage a tablet in said position whereby said returning means continues to move said instrumentalities to the starting position for tablets of a different diameter.

29. In a sound reproducing machine, the combination of sound reproducing instrumentalities, a support for a record tablet in cooperative relation with said instrumentalities, means for elevating said instrumentalities with respect to said tablet, means for returning said instrumentalities into the starting position for tablets of a predetermined diameter, and auxiliary means controlled by the weight of said instrumentalities for moving said instrumentalities into the starting position for tablets of a different diameter upon failure of said instrumentalities to engage a tablet in said first position.

30. In a sound reproducing machine, the combination of sound reproducing instrumentalities, a support for a record tablet in cooperative relation with said instrumentalities, means for returning said instrumentalities to the starting playing position for tablets of a predetermined diameter, and means rendered operative by the failure of said instrumentalities to engage a tablet for continuing the operation of said returning means to move said instrumentalities to the starting position for tablets of a different diameter.

31. In a sound reproducing machine, the combination of sound reproducing instrumentalities, a support for a record tablet in cooperative relation with said instrumentalities, means for returning said instrumentalities to the starting position for tablets of a predetermined diameter, means for engaging said instrumentalities with a tablet in said position, and means movable into cooperation with said returning means and controlled by the movement of said instrumentalities toward tablet-engaging position for continuing the operation of said returning means to move said instrumentalities to the starting position for tablets of a different diameter.

32. In a sound reproducing machine, the combination of sound reproducing instrumentalities, means for supporting a record tablet in cooperative relation with said instrumentalities, and means including a member oscillating transversely toward and from the tablet for automatically returning said instrumentalities from the end of a record to the starting position for tablets of different diameters.

33. In a sound reproducing machine, the combination of sound reproducing instrumentalities, a support for a record tablet in cooperative relation with said instrumentalities, and means including a single oscillatable member mounted for pivotally swinging movement for moving said instrumentalities outwardly from the end of a record and then inwardly to the starting position for tablets of different diameters.

34. In a sound reproducing machine, the combination of sound reproducing instrumentalities, a support for a record tablet in cooperative relation with said instrumentalities, means including a pivotally swinging member for moving said instrumentalities outwardly from the end of a record and then inwardly, and means for automatically engaging said instrumentalities with the beginning of records on tablets of different diameters.

35. In a sound reproducing machine, the combination of sound reproducing instrumentalities, a support for a record tablet in cooperative relation with said instrumentalities, means including an oscillatable member for moving said instrumentalities into the starting playing position for tablets of a predetermined diameter, and auxiliary means cooperating with said member whereby said member continues said movement upon failure of said instrumentalities to engage a tablet in said first position.

36. In a sound reproducing machine, the combination of sound reproducing instrumentalities, a support for a record tablet in cooperative relation with said instrumentalities, means including an oscillatable member for moving said instrumentalities into the starting position for tablets of different diameters, means for moving said instrumentalities into tablet-engaging position at said starting positions on tablets of different diameters, and means controlled by the failure of said instrumentalities to engage a tablet in one of said positions for continuing the operation of said member to move said instrumentalities to the starting position for tablets of a different diameter.

37. In a sound reproducing machine, the combination of sound reproducing instrumentalities, means for supporting a record tablet in cooperative relation with said instrumentalities, means including a pivotally swinging member for automatically moving said instrumentalities clear of a record tablet in playing position and then returning said instrumentalities to the starting positions for tablets of different diameters, and a second swinging member cooperating with said instrumentalities whereby the same move toward the plane of the tablet in the respective starting positions.

38. In a sound reproducing machine, the combination of sound reproducing instrumentalities, means for supporting a record tablet in cooperative relation with said instrumentalities, means including an oscillatable member for automatically returning said instrumentalities to the starting positions for tablets of different diameters, a second oscillatable member cooperating with said instrumentalities whereby the same move toward the plane of the tablet in the respective starting positions, and means controlled by the failure of said instrumentalities to engage a tablet for continuing the operation of said first-named member, and means for oscillating said members in timed relation.

39. In a sound reproducing machine, the combination of sound reproducing instrumentalities, means for supporting a record tablet in cooperative relation with the said instrumentalities, means including an oscillatable member for automatically returning said instrumentalities from the end of a record to the starting positions for tablets of different diameters, a second oscillatable member cooperating with said instrumentalities whereby the same move toward the plane of the tablet in the respective starting positions, and auxiliary means actuated by said last-named movement in the event that a tablet is not engaged and moved into cooperative relation with said first-named member whereby said member moves said instrumentalities into the starting position for tablets of a different diameter.

40. In a sound reproducing machine, the combination of sound reproducing instrumentalities, a support for a record tablet in cooperative relation with said instrumentalities, and means for disengaging said instrumentalities from the tablet and returning the same to starting position, said means including a member oscillating transversely toward and from the tablet adapted to automatically move said instrumentalities to the beginning of records on tablets of different diameters.

41. In a sound reproducing machine, the combination of sound reproducing instrumentalities, a support for a record tablet in cooperative relation with said instrumentalities, means for disengaging said instrumentalities from the tablet and returning the same to starting position, said means including a member oscillating transversely toward and from the tablet adapted to automatically move said instrumentalities to the beginning of records on tablets of different diameters, and means whereby the operation of said member on said instrumentalities is discontinued upon engagement of said instrumentalities with the tablet.

42. In a sound reproducing machine, the combination of sound reproducing instrumentalities, a support for a record tablet in cooperative relation with said instrumentalities, means for disengaging said instrumentalities from the tablet and returning the same to starting position, said means including an oscillatable member adapted to automatically move said instrumentalities to playing position at the beginning of records on tablets of different diameters, and means controlled by the failure of said instrumentalities to engage a tablet whereby said instrumentalities are moved to the starting position for tablets of a different diameter.

43. In a sound reproducing machine, the combination of sound reproducing instrumentalities, a support for a record tablet in cooperative relation with said instrumentalities, means including an oscillatable member for raising said instrumentalities, means for oscillating said member whereby said instrumentalities are lowered at the starting positions for tablets of different diameters, and means controlled by the movement of said member for moving said instrumentalities from one starting position to another upon failure of said instrumentalities to engage a tablet in the first position.

44. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the tablet and returning the same to starting position, and means controlled by the tendency of said instrumentalities to move toward the plane of the tablet for predetermining the extent of movement of the same whereby said instrumentalities are automatically engaged with records on tablets of different diameters.

45. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the tablet and moving the same beyond the periphery of the tablet, means for moving said instrumentalities inwardly, and means effective on inward movements of said instrumentalities of predetermined extents whereby said instrumentalities are moved toward the plane of the tablet at predetermined positions corresponding to starting position on tablets of different diameters independently of the presence or size of a record tablet in playing position.

46. In a sound reproducing machine, the combination of means for supporting a plurality of record tablets of different diameters sound reproducing instrumentalities, means for moving said tablets successively into cooperative relation with said instrumentalities, means for disengaging said instrumentalities from the tablet and moving the same beyond the periphery of the tablet, means for moving said instrumentalities inwardly to the starting positions for tablets of different diameters, and means controlled by the tendency of said instrumentalities to move toward the tablet for determining the extent of said inward movement.

47. In a sound reproducing machine, the combination of means for supporting a plurality of record tablets of different diameters, sound reproducing instrumentalities, means for moving said tablets successively into cooperative relation with said instrumentalities, means for returning said instrumentalities to the starting playing position for tablets of a predetermined diameter, and means controlled by the failure of said instrumentalities to engage a tablet in said position for moving said instrumentalities to the starting position for tablets of a different diameter.

48. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the tablet and returning the same to the starting position for tablets of a predetermined diameter, means for moving said instrumentalities toward the plane of the tablet in said position, and means controlled by the failure of said instrumentalities to engage a tablet during said last-named movement whereby said returning means moves said instrumentalities to the starting position for tablets of a different diameter.

49. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the tablet and returning the same to the starting position for tablets of a predetermined diameter, and auxiliary means actuated by the pressure of said instrumentalities thereon upon failure of said instrumentalities to engage a tablet for moving said instrumentalities to the starting position for tablets of a different diameter.

50. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the tablet and returning the same to starting position, means for moving said instrumentalities toward the plane of the tablet at the starting position for tablets of a predetermined diameter, and auxiliary means controlled by the movement of said instrumentalities upon their failure to engage a tablet whereby said returning means moves said instrumentalities to the starting position for tablets of a different diameter.

51. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the tablet and moving the same beyond the periphery of the tablet, means for moving said instrumentalities inwardly and toward the plane of the tablet, and means cooperating with said last-named means upon the failure of said instrumentalities to engage a table when moved toward the same for continuing said inward movement to engage said instrumentalities automatically with a tablet of a different diameter.

52. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the tablet and moving the same toward starting position, means whereby said instrumentalities are moved toward the plane of the tablet at the starting position of tablets of a predetermined diameter, and means whereby said instrumentalities are moved to a different starting position upon the failure of said instrumentalities to engage a tablet during said last-named movement.

53. In a sound reproducing machine, the combination of means for supporting a plurality of record tablets of different diameters, sound reproducing instrumentalities, means for moving said tablets successively into cooperative relation with said instrumentalities, means for returning said instrumentalities to the starting position for tablets of a predetermined diameter, means for moving said instrumentalities into tablet-engaging position, and auxiliary means movable into cooperation with said returning means and controlled by the movement of said instrumentalities toward tablet-engaging position upon their failure to engage a tablet whereby said returning means moves said instrumentalities to the starting position for tablets of a different diameter.

54. In a sound reproducing machine, the combination of means for supporting a plurality of record tablets of different diameters, sound reproducing instrumentalities, means for moving said tablets successively into cooperative relation with said instrumentalities, and means including a member oscillating transversely toward and from the tablet for automatically returning said instrumentalities to the starting positions for tablets of different diameters.

55. In a sound reproducing machine, the combination of means for supporting a plurality of record tablets of different diameters, sound reproducing instrumentalities, means for moving said tablets successively into cooperative relation with said instrumentalities, means including an oscillatable member for moving said instrumentalities to the starting positions for tablets of different diameters, means for moving said instrumentalities into tablet-engaging position at said starting positions, and means controlled by the failure of said instrumentalities to engage a tablet for continuing the operation of said member to move said instrumentalities from one starting position to another.

56. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the tablet and returning the same to starting position, and means for moving said instrumentalities into tablet-engaging position including a member oscillating transversely toward and from the tablet adapted to automatically engage said instrumentalities with records on tablets of different diameters.

57. In a sound reproducing machine, the combination of means for supporting a plurality of record tablets of different diameters, sound reproducing instrumentalities, means for moving said tablets successively into cooperative relation with said instrumentalities, means for disengaging said instrumentalities from the end of the tablet and returning the same to starting position, means for moving said instrumentalities into tablet-engaging position including an oscillatable member swinging transversely toward and from the tablet adapted to automatically engage said instrumentalities with records on tablets of different diameters, and means controlled by the oscillation of said member whereby said returning means may move said instrumentalities from one starting position to another.

58. In a sound reproducing machine, the combination of sound reproducing instrumentalities, a support for a record tablet in cooperative relation with said instrumentalities, means for moving said instrumentalities reversely, means for automatically disengaging said instrumentalities from said tablet and returning the same to the starting positions for tablets of different diameters, and means controlled by said reverse movement for initiating the operation of said disengaging and returning means.

59. In a sound reproducing machine, the combination of sound reproducing instrumentalities, a support for a record tablet in cooperative relation with said instrumentalities, means for moving said instrumentalities reversely, means for disengaging said instrumentalities from said tablet and returning the same to starting position, means whereby said reverse movement initiates the operation of said disengaging and returning means, and means for automatically positioning said instrumentalities at the starting position on tablets of different diameters.

60. In a sound reproducing machine, the combination of sound reproducing instrumentalities, a support for a record tablet in cooperative relation with said instrumentalities, means for moving said instrumentalities reversely, means for disengaging said instrumentalities from said tablet and returning the same to starting position, means whereby said reverse movement initiates the operation of said disengaging and returning means, and means controlled by the tendency of said instrumentalities to move toward the tablet for determining the extent of said returning movement.

61. In a sound reproducing machine, the combination of sound reproducing instrumentalities, a support for a record tablet in cooperative relation with said instrumentalities, means for moving said instrumentalities reversely, means for disengaging said instrumentalities from said tablet and returning the same to the starting position for tablets of a predetermined diameter, means actuated by said reverse movement to initiate the action of said disengaging and returning means, and means controlled by the failure of said instrumentalities to engage a tablet in said starting position for moving said instrumentalities to the starting position for tablets of a different diameter.

62. In a sound reproducing machine, the combination of sound reproducing instrumentalities, a support for a record tablet in cooperative relation with said instrumentalities, means for moving said instrumentalities reversely, means for disengaging said instrumentalities from said tablet and returning the same to the starting position for tablets of a predetermined diameter, means controlled by said reverse movement to initiate the action of said disengaging and returning means, means for moving said instrumentalities into tablet-engaging position, and means controlled by the failure of said instrumentalities to engage a tablet during said movement for moving said instrumentalities to the starting position for tablets of a different diameter.

63. In a sound reproducing machine, the combination of sound reproducing instrumentalities, a support for a record tablet in cooperative relation with said instrumentalities, means for moving said instrumentalities reversely, means for disengaging said instrumentalities from said tablet and returning the same to the starting position for tablets of a predetermined diameter, means controlled by said reverse movement to initiate the action of said disengaging and returning means, and means controlled by the failure of said instrumentalities to engage a tablet whereby said returning means moves said 64. In a sound reproducing machine, the combination of sound reproducing instrumentalities, a support for a record tablet in cooperative relation with said instrumentalities, means for moving said instrumentalities reversely, means for disengaging said instrumentalities from said tablet and returning the same to the starting position for tablets of a predetermined diameter, means controlled by said reverse movement to initiate the action of said disengaging and returning means, means for moving said instrumentalities into tablet-engaging position, and means controlled by the movement of said instrumentalities toward tablet-engaging position in the absence of a tablet of said predetermined diameter whereby said returning means moves said instrumentalities to the starting position for tablets of a different diameter.

65. In a sound reproducing machine, the combination of sound reproducing instrumentalities, a support for a record tablet in cooperative relation with said instrumentalities, means for moving said instrumentalities reversely, an oscillatable member for automatically returning said instrumentalities to the starting positions for tablets of different diameters, and means controlled by said reverse movement to initiate the operation of said member.

66. In a sound reproducing machine, the combination of sound reproducing instrumentalities, a support for a record tablet in cooperative relation with said instrumentalities, means for moving said instrumentalities reversely, an oscillatable member for returning said instrumentalities to the starting positions, for tablets of different diameters, an oscillatable member for moving said instrumentalities into tablet-engaging position at said respective starting positions, and means controlled by the failure of said instrumentalities to engage a tablet in one of said positions whereby said first-named member moves said instrumentalities to the starting position for tablets of a different diameter.

67. In a sound reproducing machine, the combination of sound reproducing instrumentalities, a support for a record tablet in cooperative relation with said instrumentalities, means for moving said instrumentalities reversely, means for returning said instrumentalities to the starting positions for tablets of different diameters, means including an oscillatable member for moving said instrumentalities toward the plane of the tablet in each of said positions, and means for moving said instrumentalities from one starting position to another upon failure of said instrumentalities to engage a tablet.

68. In a sound reproducing machine, the combination of sound reproducing instrumentalities, means for supporting a plurality of record tablets, means for moving said tablets into and out of cooperative relation with said instrumentalities, means for moving said instrumentalities to starting position, means adapted to be tripped and controlled by the movement of said instrumentalities for initiating the operation of the tablet moving means and means for moving said instrumentalities, and manual means for actuating said tripping means independently of the movement of said instrumentalities.

69. In a sound reproducing machine, the combination of sound reproducing instrumentalities, means for supporting a plurality of record tablets, means for moving said tablets into and out of cooperative relation with said instrumentalities, means for moving said instrumentalities to starting position, means cooperating with said instrumentalities whereby the same are moved reversely at the end of the record, means controlled by said reverse movement for initiating the operation of said tablet-changing and instrumentality-returning means, and means for manually releasing said tablet-changing and instrumentality-returning means.

70. In a sound reproducing machine, the combination of sound reproducing instrumentalities, means for supporting a plurality of record tablets, means for moving said tablets into and out of cooperative relation with said instrumentalities, means for moving said instrumentalities to starting position, an eccentric element on each record tablet adapted to move said instrumentalities reversely, a trip member controlled by said reverse movement of said instrumentalities for initiating the operation of said tablet-changing and instrumentality-returning means, and manual means for operating said trip member.

71. In a sound reproducing machine, the combination of sound reproducing instrumentalities, means for supporting a plurality of record tablets, record rotating means, swinging means for moving said tablets into and out of cooperative relation with said instrumentalities, means for moving said instrumentalities to starting position, a motor for operating the three last named means, means automatically operative on completion of reproduction of a record for initiating the operation of the two last named means, and a clutch for disconnecting said motor from the two last named means without interfering with the operation of said record rotating means.

72. In a sound reproducing machine, the combination of sound reproducing instrumentalities, a single support for rotating a record tablet in cooperative relation with said instrumentalities, means for supporting a plurality of record tablets, means for moving said tablets into and out of playing position on said support, means for returning said instrumentalities to starting position, a motor for driving said support and said tablet-changing and instrumentality-returning means, means automatically operative on completion of reproduction of a record for initiating the operation of the two last named means, and a clutch for disconnecting said last named means from said motor whereby said support may be rotated and a record reproduced without the operation of said means.

73. In a sound reproducing machine, the combination of a tone-arm, a reproducer pivotally mounted thereon to be moved to an inoperative position, a support for a record in cooperative relation with said reproducer, means for returning said tone-arm and reproducer to starting position including an oscillatable member and a member on the tone-arm normally held in engagement therewith, said engagement being controlled by the tendency of the reproducer to move toward the tablet, and means on the tone-arm adapted to be engaged by the reproducer in inoperative position for maintaining said members in their cooperative relation.

In testimony whereof I have signed this specification.

SAMUEL H. WISMER.